United States Patent
Ioffe et al.

(10) Patent No.: US 11,229,002 B2
(45) Date of Patent: Jan. 18, 2022

(54) RANGING WITH A MOBILE CELLULAR DEVICE

(71) Applicant: Apple Inc., Cupertino, CA (US)

(72) Inventors: Anatoliy Sergey Ioffe, Redwood City, CA (US); Rohit U. Nabar, Sunnyvale, CA (US); Rastislav Vazny, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/824,350

(22) Filed: Mar. 19, 2020

(65) Prior Publication Data
US 2021/0076349 A1 Mar. 11, 2021

Related U.S. Application Data

(60) Provisional application No. 62/896,372, filed on Sep. 5, 2019.

(51) Int. Cl.
| | |
|---|---|
| *H04W 64/00* | (2009.01) |
| *G01S 5/02* | (2010.01) |
| *H04W 72/04* | (2009.01) |
| *H04W 74/08* | (2009.01) |
| *H04W 16/14* | (2009.01) |

(52) U.S. Cl.
CPC ......... *H04W 64/006* (2013.01); *G01S 5/0273* (2013.01); *H04W 16/14* (2013.01); *H04W 72/0453* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 2011/0195736 A1* | 8/2011 | Nakatsugawa | ....... H04L 1/0026 455/509 |
| 2016/0054440 A1 | 2/2016 | Younis | |
| 2019/0208387 A1 | 7/2019 | Jiang et al. | |
| 2019/0293781 A1* | 9/2019 | Bolin | ....... G01S 7/023 |
| 2019/0364424 A1* | 11/2019 | Vanderveen | ....... H04W 12/02 |
| 2019/0369233 A1* | 12/2019 | Niesen | ....... G01S 13/5244 |
| 2020/0107249 A1* | 4/2020 | Stauffer | ....... G01S 13/42 |
| 2020/0229102 A1* | 7/2020 | Gubeskys | ....... H04B 1/3838 |
| 2020/0314911 A1* | 10/2020 | Lei | ....... H04W 72/04 |
| 2020/0319327 A1* | 10/2020 | Tsvelykh | ....... G05D 1/0257 |
| 2020/0348390 A1* | 11/2020 | Lien | ....... G01S 13/42 |
| 2021/0080580 A1* | 3/2021 | Tsvelykh | ....... G01S 7/006 |

FOREIGN PATENT DOCUMENTS

| | | |
|---|---|---|
| WO | 2017200896 A2 | 11/2017 |
| WO | 2018097817 A1 | 5/2018 |

OTHER PUBLICATIONS

International Search Report & Written Opinion for PCT Application No. PCT/US2020/045277 dated Nov. 2, 2020; 17 pgs.

* cited by examiner

*Primary Examiner* — German Viana Di Prisco
(74) *Attorney, Agent, or Firm* — Fletcher Yoder PC

(57) ABSTRACT

Systems and methods for using ranging signals with cellular devices. The ranging signals may utilize ranging slots and resources at least partially allocated by a cellular network. The resources may include frequencies used for uplink or downlink communications between the cellular network and the cellular devices. Alternatively, the resources may include frequencies outside of a spectrum used for communication between the cellular network and the cellular devices.

20 Claims, 15 Drawing Sheets

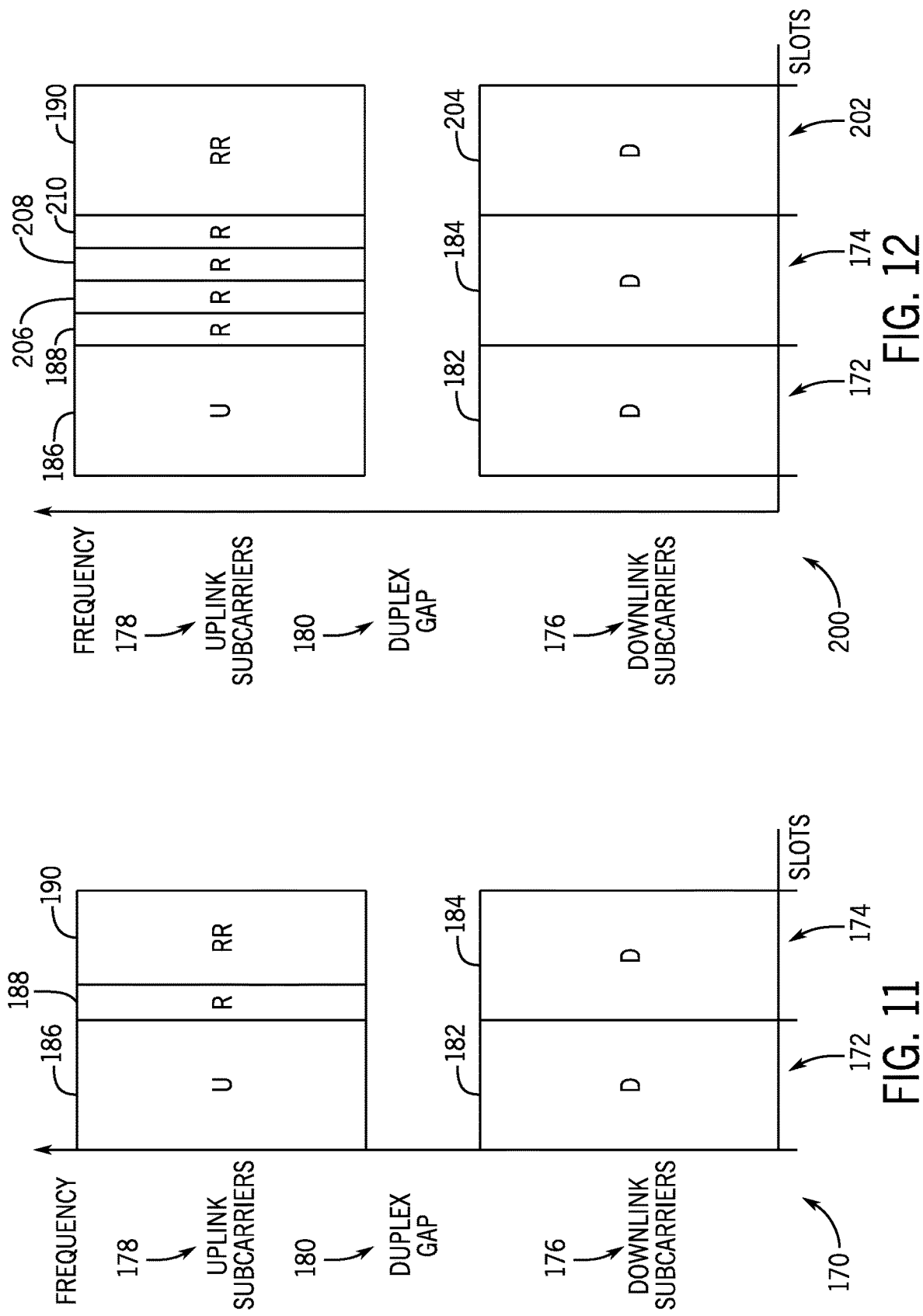

RANGING WITH A MOBILE CELLULAR DEVICE

CROSS-REFERENCE TO RELATED APPLICATION

This application claims priority to U.S. Provisional Application No. 62/896,372, filed Sep. 5, 2019, and entitled "RANGING WITH A MOBILE CELLULAR DEVICE," which is incorporated herein by reference in its entirety for all purposes.

BACKGROUND

The present disclosure relates generally to wireless communication systems and, more specifically, to systems and methods for performing ranging using a mobile device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Personal electronic devices, such as mobile handheld devices, body-wearable devices, and head-wearable devices, are now ubiquitous. The prevalence of these devices enable usage of augmented reality (AR) using the personal electronic devices. Furthermore, personal electronic devices are able to access more information as wireless network throughput increases thereby potentially increasing the usefulness of updated AR information. For at least these reasons, AR is expected to proliferate into the mainstream with widely available gigabit broadband wireless speeds brought to the consumer market by the 5th generation new radio (5G NR) networks.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Personal electronic devices (e.g., a head-wearable devices, mobile handheld devices, body-wearable devices, etc.) may be configured to transmit and receive ranging (e.g., radio detection and ranging (RADAR)) signals to perform obstacle detection and/or tracking. Ranging using the ranging signals may be particularly useful when the personal electronic devices are used to perform augmented reality. The ranging signals may use licensed or unlicensed spectrums at relatively high frequencies (e.g., above 52.6 GHz). The allocation of ranging transmission portions and ranging receiving portions for each device connected to a cellular network may be at least partially managed by the network. The allocated resources during these portions may include time domain and/or frequency domain resources for frequencies used to send/receive cellular communications, time domain and/or frequency domain resources for frequencies outside of those used to send/receive cellular communications, resources for a single ranging occurrence, resources for repeated ranging occurrences, resources for multiple ranging devices transmitting in a single slot, and the like.

Furthermore, ranging operations may be enhanced with additional features beyond mere usage of ranging signals for ranging uses. For example, the ranging signals may be encoded to enable receiving devices to identify the ranging device. Additionally or alternatively, side-link (SL) discovery sequences may be embedded in the ranging signals to enable neighbor discovery of the ranging device. The device identification/neighbor discovery may be restricted to only devices that have a previously established security context with the ranging device. Additionally or alternatively, enhanced positioning sequences (ePS) may be embedded in the ranging signals to enable the network to identify a location of the ranging device in a highly precise manner using known locations of devices receiving the ePS signals.

BRIEF DESCRIPTION OF THE DRAWINGS

Various aspects of this disclosure may be better understood upon reading the following detailed description and upon reference to the drawings in which:

FIG. 11 is a graph of ranging allocation for the ranging system of FIG. 7 using frequency-division duplexing with multiple ranging devices, in accordance with embodiments of the present disclosure;

FIG. 12 is a graph of ranging allocation for the ranging system of FIG. 7 using frequency-division duplexing with multiple ranging devices, in accordance with embodiments of the present disclosure;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
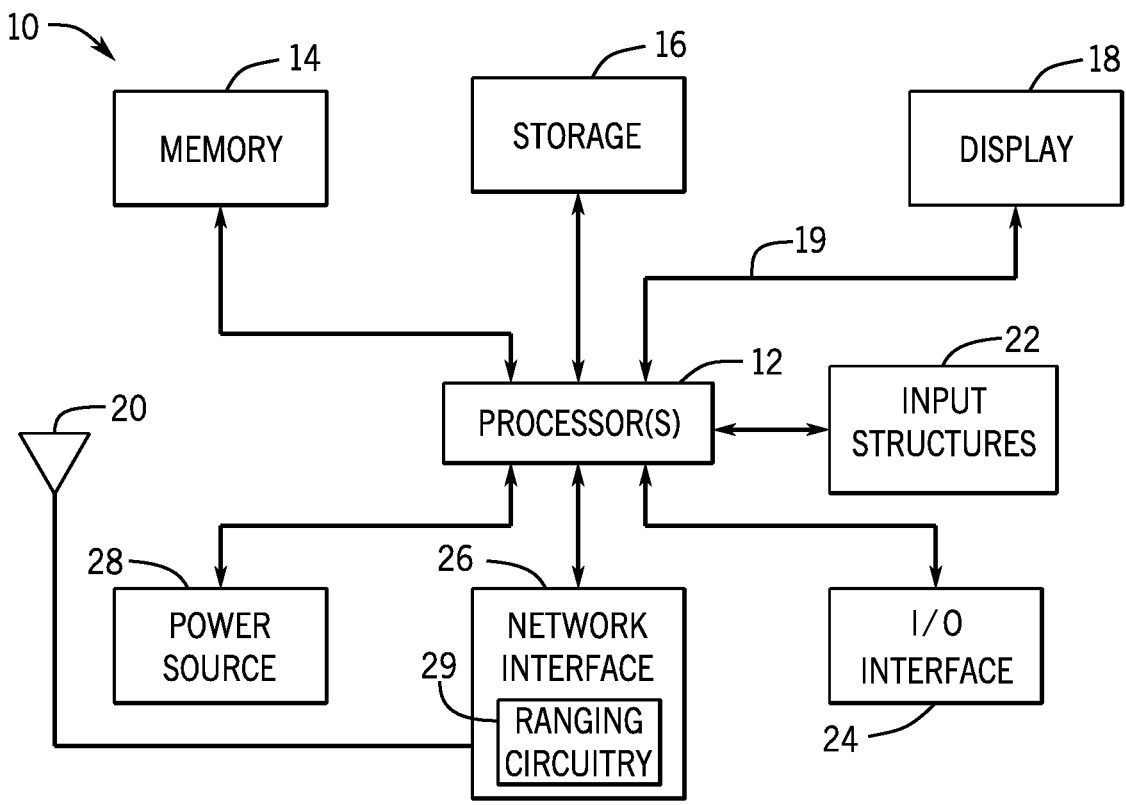
FIG. 1 is a block diagram of an electronic device that includes one or more antennas to send and/or receive ranging signals, in accordance with an embodiments of the present disclosure.

Turning first to FIG. 1, an electronic device 10 according to an embodiment of the present disclosure may include, among other things, one or more processor(s) 12, memory 14, nonvolatile storage 16, a display 18, one or more antennas 20, input structures 22, an input/output (I/O) interface 24, a network interface 26 coupled to the antenna(s) 20, and a power source 28. The various functional blocks shown in FIG. 1 may include hardware elements (including circuitry), software elements (including computer code stored on a computer-readable medium), or a combination of both hardware and software elements. It should be noted that FIG. 1 is merely one example of a particular implementation and is intended to illustrate the types of components that may be present in electronic device 10.

Figure 2:
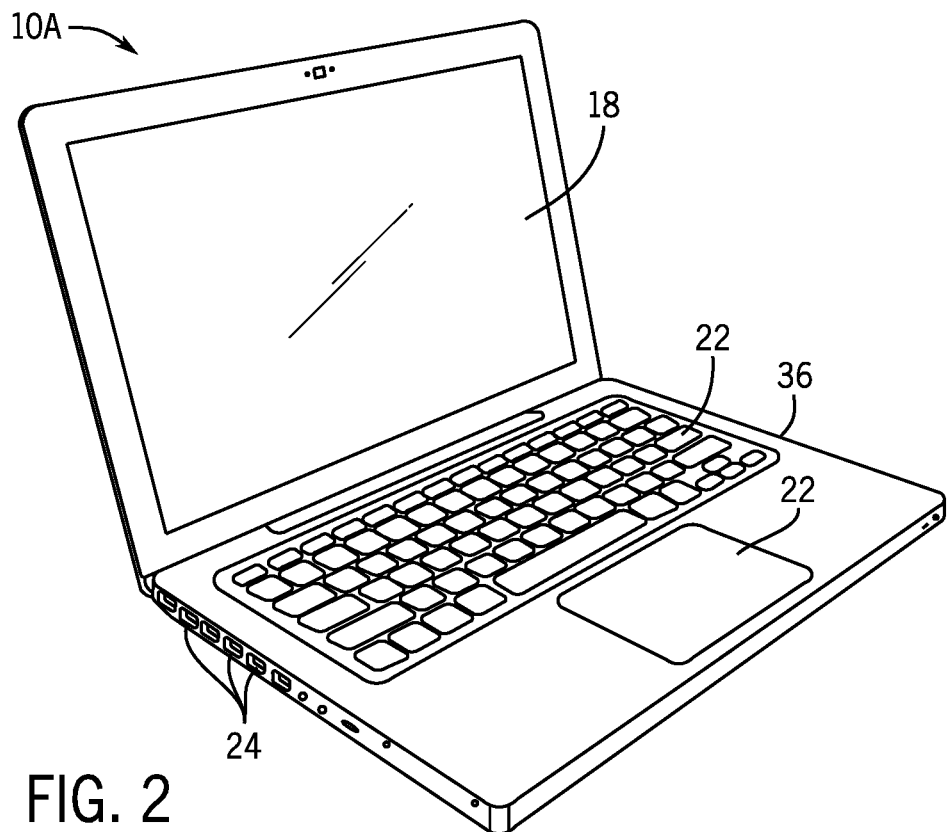
FIG. 2 is a perspective view of a notebook computer representing an embodiment of the electronic device of FIG. 1.
Figure 4:
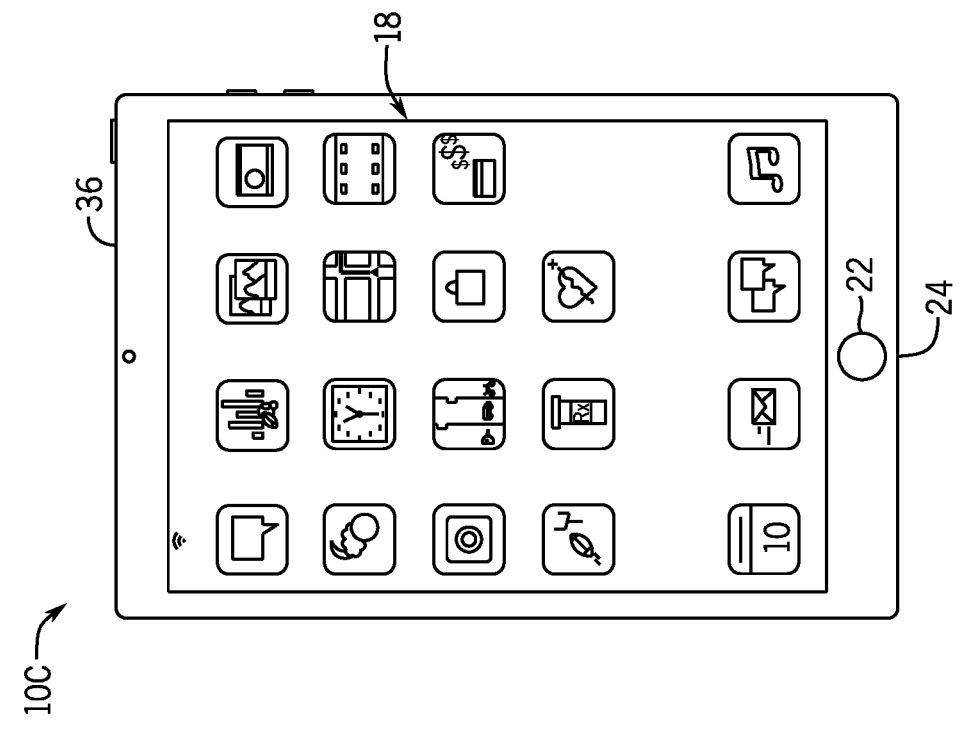
FIG. 4 is a front view of another hand-held device representing another embodiment of the electronic device of FIG. 1.
Figure 3:
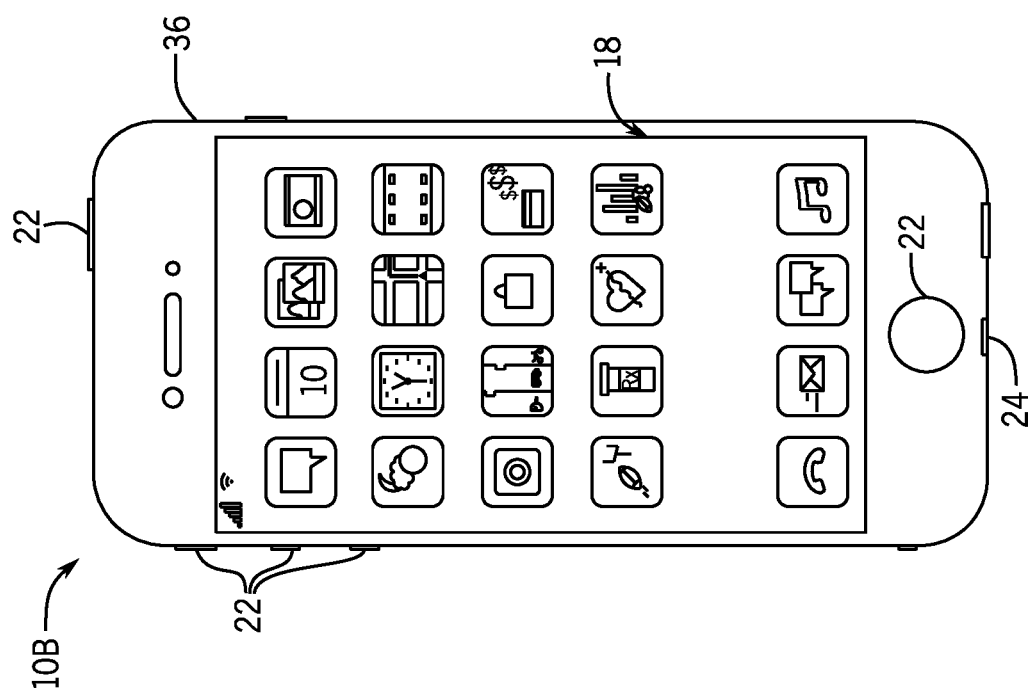
FIG. 3 is a front view of a hand-held device representing another embodiment of the electronic device of FIG. 1.
Figure 5:
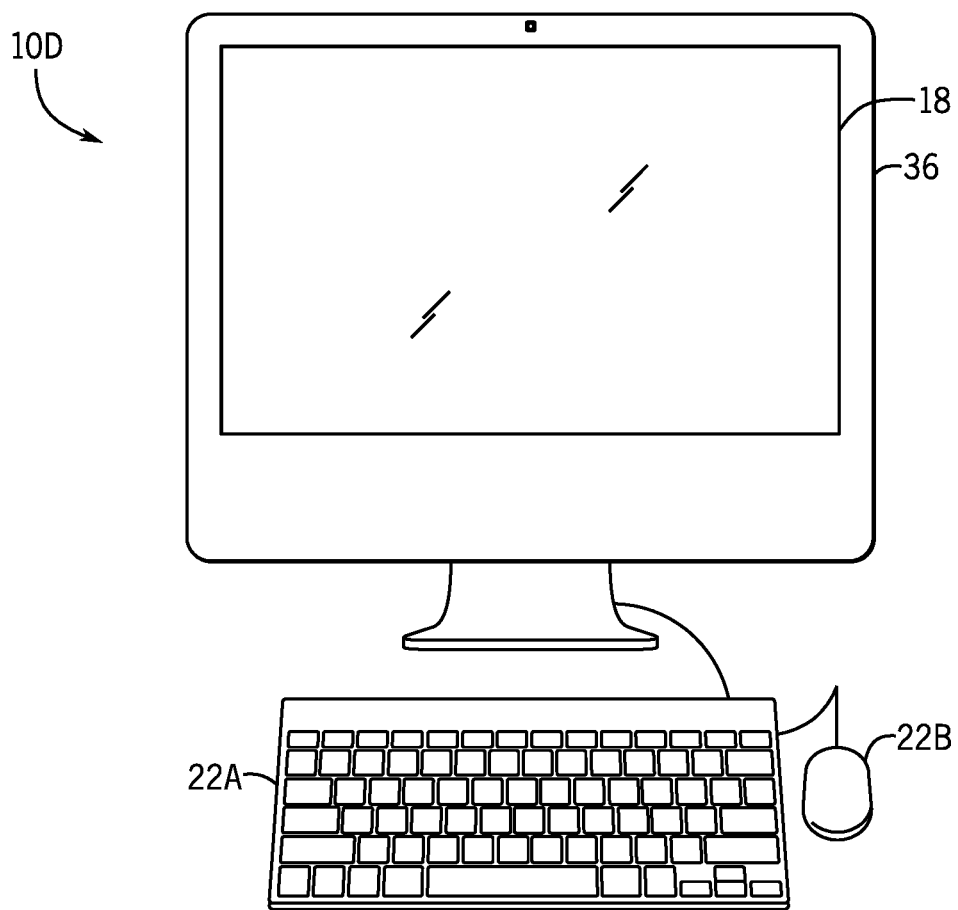
FIG. 5 is a front view of a desktop computer representing another embodiment of the electronic device of FIG. 1.
Figure 6:
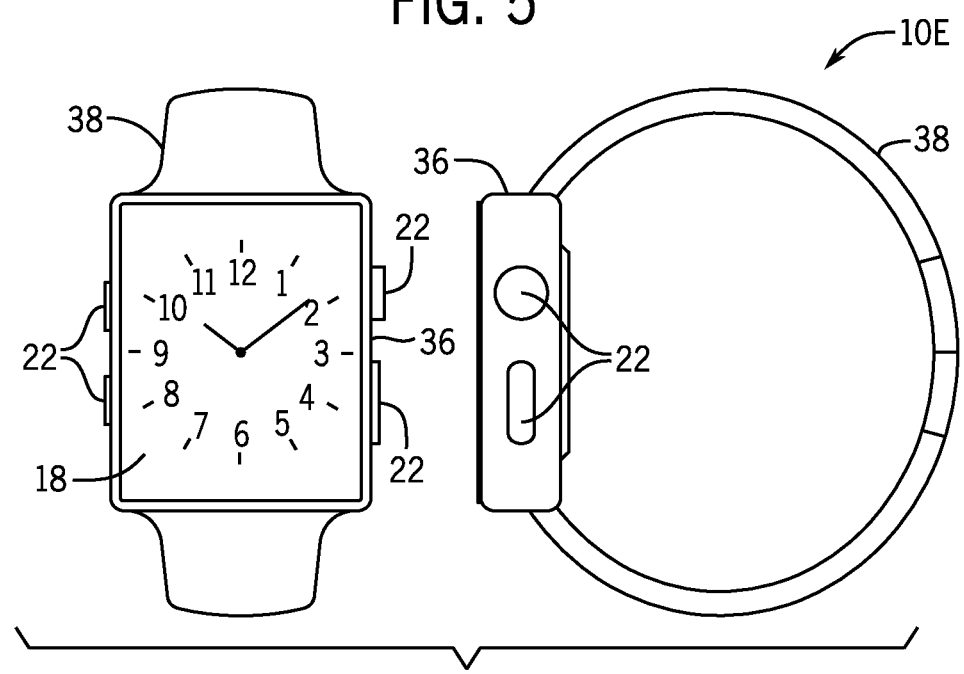
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26.

The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, universal mobile telecommunication system (UMTS), 4th generation (4G) cellular network, long term evolution (LTE) cellular network, a long term evolution license assisted access (LTE-LAA) cellular network, 5th generation (5G) cellular network, 5G New Radio (5G NR) cellular network, and/or 5G NR cellular network evolution. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. For example, network interfaces 26 may be capable of joining multiple networks, and may employ the one or more antennas 20 to that end.

As will be discussed in more detail below, the network interface 26 may be used to perform ranging using the electronic device 10. In some embodiments, to perform ranging, the network interface 26 may include ranging circuitry 29 that is part of communication circuitry (e.g., network interface 26, etc.) that enables wireless communication by the electronic device 10. The ranging circuitry 29 enables the electronic device 10 to utilize one or more of the antennas 20 to perform the ranging in addition to wireless signals (e.g., 5G NR signals) sent by the communication circuitry to communicate with one or more networks (e.g., 5G NR cellular network). Additionally or alternatively, the electronic device 10 may utilize the processor(s) 12 to at least partially enable the ranging using the network interface 26 with or without inclusion of the ranging circuitry 29 in the electronic device 10.

As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MACBOOK®, MACBOOK® PRO, MACBOOK AIR®, IMAC®, MAC® MINI, OR MAC PRO® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® OR IPHONE® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an IMAC®, a MACBOOK®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various input structures 22, such as the keyboard 22A or mouse 22B, which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 38, may be an APPLE WATCH® by Apple Inc. However, in other embodiments, the wearable electronic device 10E may include any wearable electronic device such as, for example, a head-wearable device or wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E. Furthermore, the wearable electronic device 10E may receive at least a portion of data (e.g., cellular data) from another device, such as the handheld device 10B.

With the foregoing in mind, the electronic device 10 may be used to perform ranging in various scenarios, such as when augmented reality (AR) is engaged for the electronic device 10. For example, the ranging circuitry 29 may include processing circuits and/or software for generating the ranging signals and analyzing reflected ranging signals.

For instance, the ranging circuitry 29 may include instructions that are stored in the memory 14, that when executed by the processor(s) 12, cause the processor(s) 12 to analyze the received, reflected ranging signals or cause the processor(s) 12 to offload a portion of the analysis to another computing device (e.g., cloud computing device).

Ranging may be performed in a licensed (e.g. 71-86 GHz range and/or may vary based on regional regulations) or an unlicensed spectrum (e.g., in the 57-71 GHz range and/or may vary based on regional regulations) may be used to enable a ranging implementation (e.g., a radio detection and ranging (RADAR) implementation) in the electronic device 10 with an integrated (e.g., 60 GHz) radio and antennas 20. Ranging may use transmission of ranging signals in a wide-band sequence that, when received via reflections from objects, are used to estimate the channel impulse and to identify objects when combined with spatial processing. The inclusion of the ranging circuitry 29 including ranging logic and/or circuitry in the electronic device may use various frequencies (e.g., those above 52.6 GHz) to enhance ranging by enabling the electronic device 10 and/or a network to which the electronic device 10 is coupled to 1) manage system interference from multiple users in a high-density environment, 2) optimize the allocation of frequency/time resources to ranging use based on network deployment topology, network load, and user mobility, and 3) perform potential maximum permissible exposure (MPE) applications with user proximity sensing opportunities managed by the network.

Figure 7:
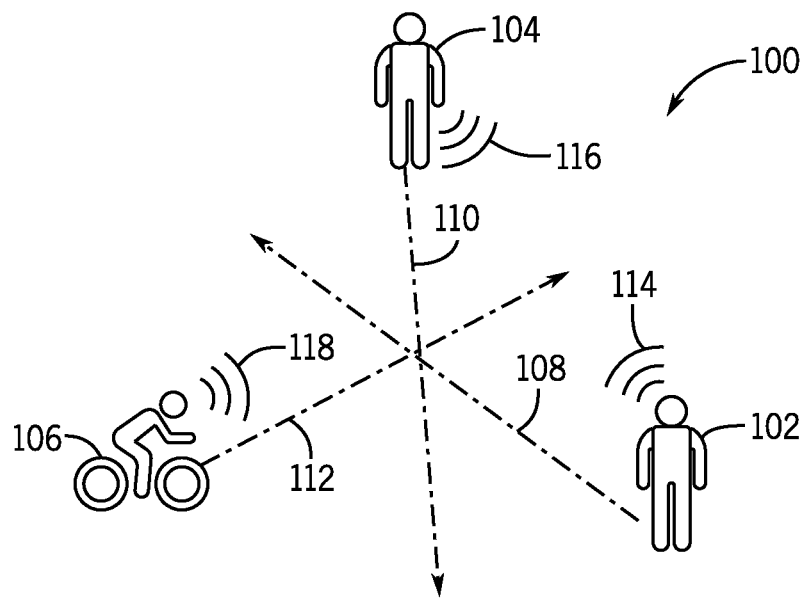
FIG. 7 is a diagram of a ranging system including the electronic device of FIG. 1, in accordance with embodiments of the present disclosure.

FIG. 7 illustrates a diagram of a ranging system 100 with users 102, 104, and 106 each having respective electronic devices (e.g., the electronic device 10). Each of the users 102, 104, and 106 has a respective direction of motion 108, 110, and 112 and ranging signals 114, 116, and 118 broadcast in that one or more directions. For example, if the respective ranging devices use beamforming, the ranging signals 114, 116, and 118 may be formed in the respective direction of motion 108, 110, and 112. The respective electronic devices 10 and/or other devices in the network(s) on which the electronic devices 10 reside may use information from ranging signals to detect and/or track obstacles based on the ranging signals 114, 116, and/or 118 and the respective direction of motion 108, 110, and/or 112. Additionally or alternatively, the respective electronic devices 10 and/or other devices in the network(s) on which the electronic devices 10 may predict a collision based on the ranging signals 114, 116, and/or 118 and the respective direction of motion 108, 110, and/or 112.

Figure 8:
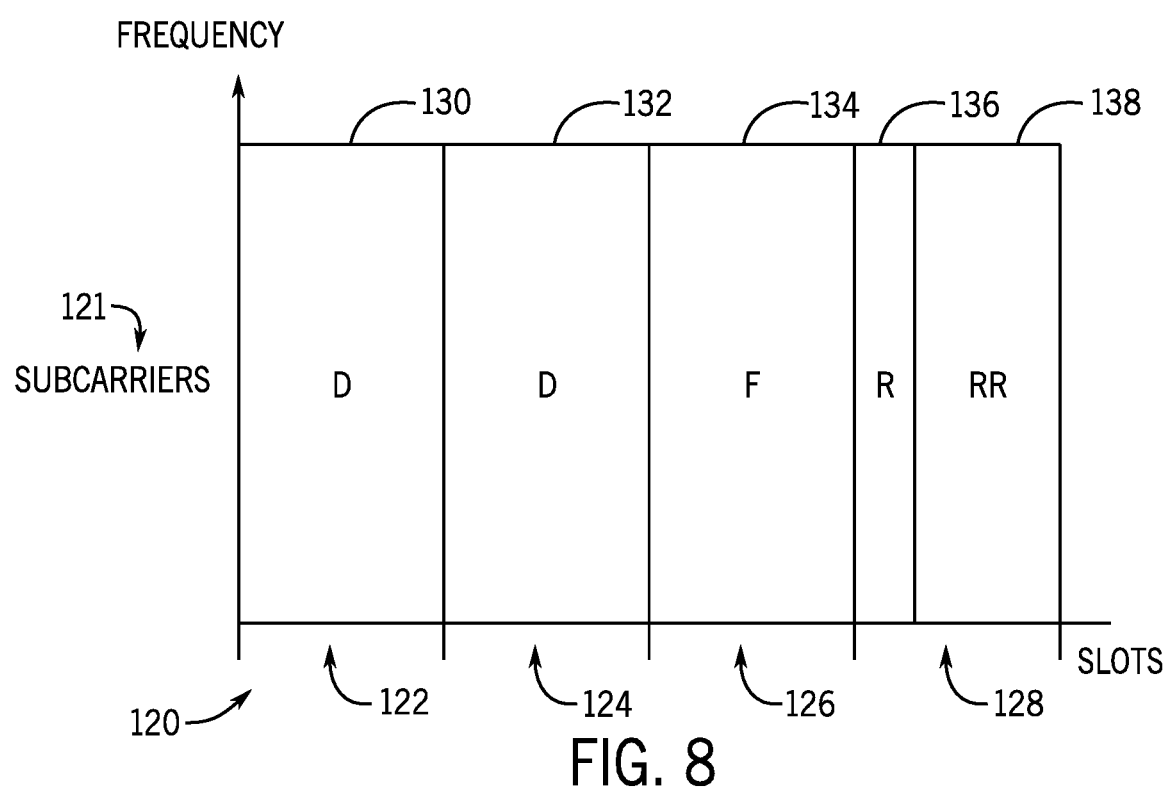
FIG. 8 is a graph of ranging allocation for the ranging system of FIG. 7 using time-division duplexing with multiple ranging devices, in accordance with embodiments of the present disclosure.

The ranging signals 114, 116, and 118 may be multiplexed with cellular signals used by the electronic device 10 to communicate with respective cellular networks when the ranging signals 114, 116, and 118 utilize a same band that the cellular signals use. For example, FIG. 8 illustrates a graph 120 of a time-division duplexing (TDD) system where ranging and cellular communications are both performed using the same band. The graph 120 graphs the allocation of subcarriers 121 for the network in each slot. As illustrated, the graph 120 includes slots 122, 124, 126, and 128. The slots 122 and 124 are allocated to downlink communications in downlink communication portions 130 and 132 between the electronic device 10 and its cellular network, while the slot 126 is flexibly allocated to uplink and/or downlink communications in a flexible communications portion 134. The slot 128 is partially allocated to a ranging transmission portion 136 that is allocated to the electronic device 10 sending out ranging signals (e.g., ranging signals 114, 116, and 118). The remainder of the slot 128 is allocated to a ranging receiving portion 138 that is allocated to the electronic device 10 listening for reflection back of the ranging signals transmitted during the ranging transmission portion 136.

Due to a numerology for the cellular network, a single slot may be insufficient to perform both transmission and reception of the ranging signals. For example, objects above a threshold distance away from the electronic device 10 may be unable to reflect the ranging signals back to the electronic device 10 before the slot 128 expires. For example, a round-trip time of the ranging signals may be limited by slot duration, such that an allocated portion of time (e.g., one slot) may restrict the range of the ranging process. For instance, assuming that each ranging signal round-trip time is equal to a single slot, Table 1 illustrates a sub-carrier spacing (in kHz) that identifies a frequency spacing between adjacent carriers along with the corresponding slot length (in ms) and max range (in m).

TABLE 1

Slot length and maximum ranging range by SCS frequency

| SCS (kHz) | Slot length (ms) | Max range (m) |
|---|---|---|
| 15 | 1 | 150 |
| 30 | 0.5 | 75 |
| 60 | 0.25 | 37 |
| 120 | 0.125 | 19 |
| 240 | 0.0625 | 9 |
| 480 | 0.03125 | 5 |
| 960 | 0.015625 | 2 |

Figure 9:
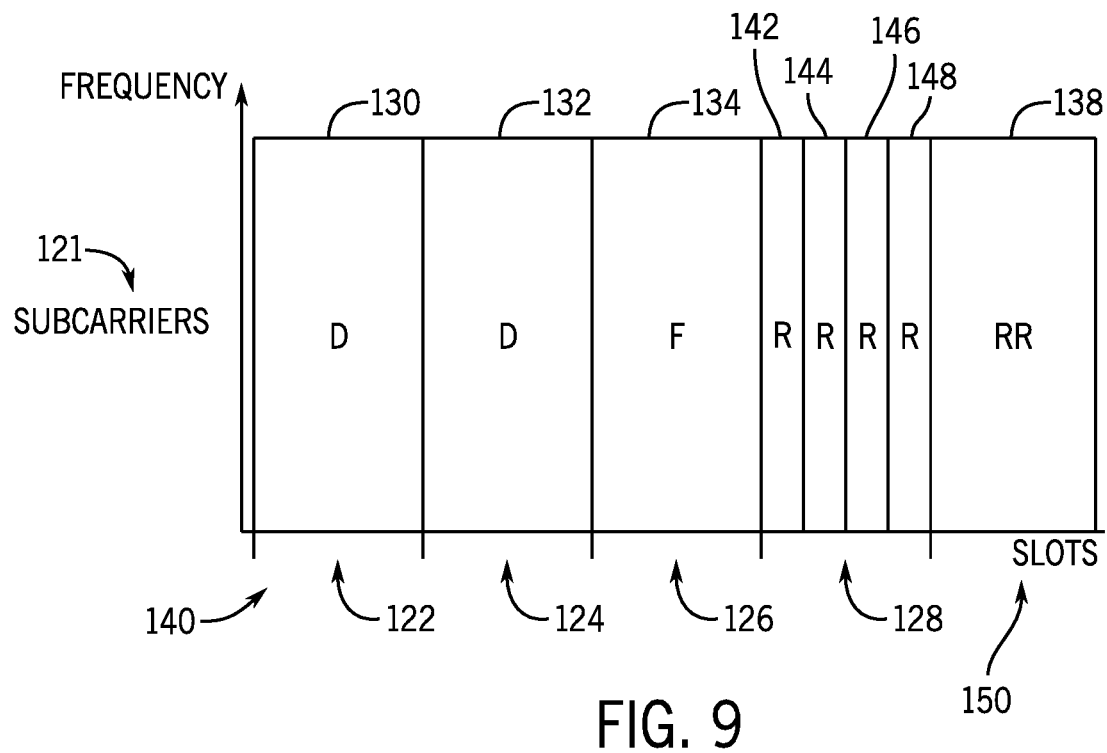
FIG. 9 is a graph of ranging allocation for the ranging system of FIG. 7 using time-division duplexing with multiple ranging devices, in accordance with embodiments of the present disclosure.

As shown, the propagation of the ranging signals back from objects further away from the electronic device 10 than the threshold distance may not be received quickly enough to occur in the same slot (e.g., the slot 128) that the ranging signals are transmitted (e.g., the ranging transmission portion 136). To provide additional ranging distance, the ranging receiving portion 138 may be allocated to a different slot in addition to or alternative to the slot to which the ranging transmission portion 136 is assigned. Furthermore, when the ranging transmission portion 136 and the ranging receiving portion 138 are in different slots, the ranging transmission portion 136 may be completed during a fraction of the slot 128. Using the remaining portion of the slot 128, multiple users may be allocated portions of the slot 128 to transmit respective ranging signals. In other words, users in a same general area (e.g., in a same cell and/or adjacent cells of a wireless network) may share the slot 128 that is time-divided between the users with allocated portions of the slot 128 to manage potential system interference in high-density environments. For example, FIG. 9 illustrates a graph 140 of a TDD system with sub-portions corresponding to ranging transmission portions 142, 144, 146, and 148 each allocated to a respective electronic device 10 in the cellular network. As illustrated, the ranging receiving portion 138 has been allocated to a slot 150 for all of the electronic devices 10 to monitor for respective reflected ranging signals transmitted during respective ranging transmission portions during the slot 128. Since the network may control the allocation of the ranging portions of the slots, in some embodiments, the network may ignore ranging transmissions at base stations during certain slots since the network is aware that cellular communications are not to occur at those slots.

Figure 10:
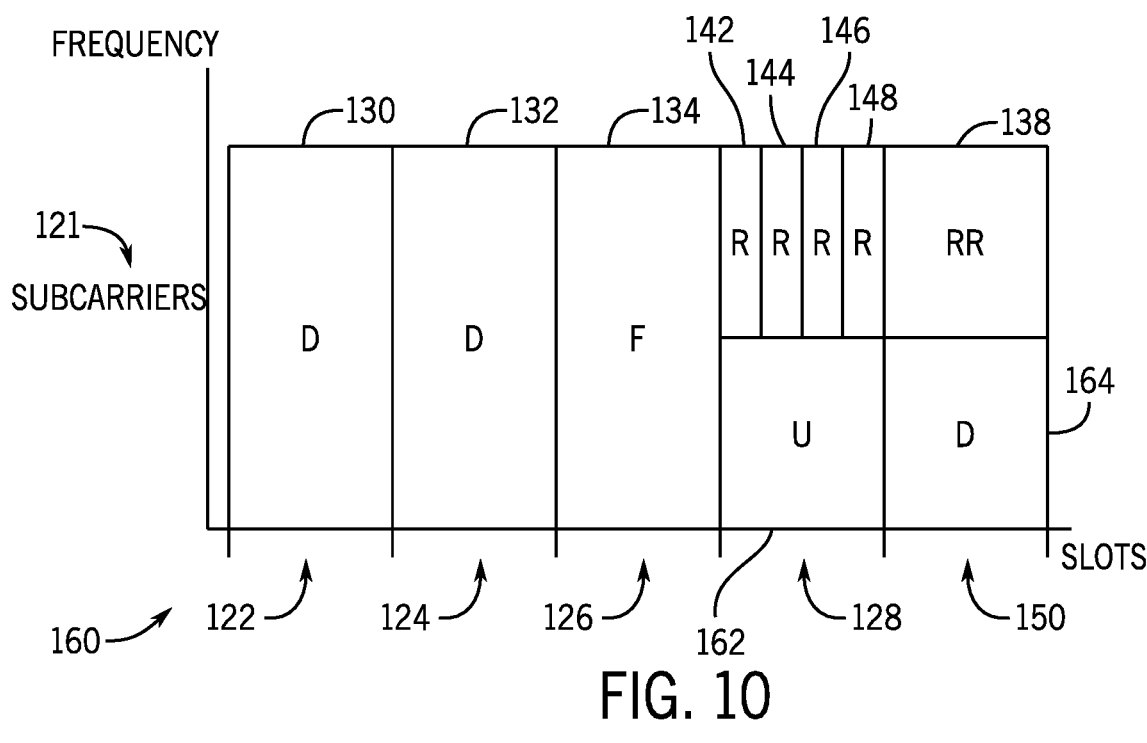
FIG. 10 is a graph of ranging allocation for the ranging system of FIG. 7 using time-division duplexing with multiple ranging devices using only a portion of the bandwidth of the electronic device of FIG. 1, in accordance with embodiments of the present disclosure.

As previously noted, ranging using the ranging signals may use a wide-band sequence. For instance, the in-band resources for ranging may be allocated to span the full channel bandwidth as illustrated in FIGS. 8 and 9. However, although a wider band gives more details, wider bands have a reduced power spectral density and ranging to far ranges may be too far for the wider band. Instead, a narrower band (e.g., part of the bandwidth of the band) may be used. In other words, ranging may use only a portion of the channel bandwidth while a remainder of the bandwidth is used for cellular transmissions. For instance, FIG. 10 illustrates a graph 160 illustrating that, during the slot 128, some of the bandwidth is allocated to ranging for the ranging transmission portions 142, 144, 146, and 148 and the ranging receiving portion 138. Uplink bands 162 are provided using portions of the bandwidth in the slot 128 not allocated to ranging. Similarly, downlink banks 164 are provided using portions of the bandwidth in the slot 150 not allocated to ranging.

Although FIGS. 8-10 illustrated a TTD system with uplink and downlink communications happening at different times in the same band, ranging may be performed in systems that are frequency-division duplexing (FDD). For instance, FIG. 11 illustrates a graph of slots 172 and 174 with downlink subcarriers 176 operated in a first frequency band and uplink subcarriers 178 operating in a second frequency band. The first and second frequency bands are separated by a duplex gap 180. As illustrated, the first frequency band may contain frequencies that are lower than those in the second frequency band. Alternatively, the first frequency band may contain frequencies that are higher than those in the second frequency band. As illustrated, during the slots 172 and 174, the downlink subcarriers 176 may be allocated to downlink communication portions 182 and 184. Similarly, during the slot 172, the uplink subcarriers 178 may be allocated to downlink communication portions 186. During the slot 174, the uplink subcarriers 178 may be allocated to a ranging transmission portion 136 and a ranging receiving portion 138. Additionally or alternatively, the downlink subcarriers 176 may be allocated to ranging during the slot 174.

As previously discussed, there may be insufficient time for transmission and receiving of the ranging signals to be completed during the same slot (e.g., slot 174). FIG. 12 illustrates a graph 200 of allocations of the downlink subcarriers 176 in slots 172, 174, and 202 with respective downlink portions 182, 184, and 204. The uplink subcarriers 178 in an FDD system with multiple users/electronic devices 10 allocated to transmit ranging signals during the ranging transmission portions 188, 206, 208, and 210 during the slot 174. The ranging receiving portion 190 is delayed until the slot 202. Although the graph 200 illustrates the ranging transmission portions 188, 206, 208, and 210 allocated for respective ranging devices in the slot 174, in some embodiments, the ranging transmission portion 136 may be the only allocation in the slot 174 when the ranging receiving portion 190 is in a separate slot (e.g., the slot 174 or the slot 202). Additionally or alternatively, ranging may use the downlink subcarriers 176.

Figure 13:
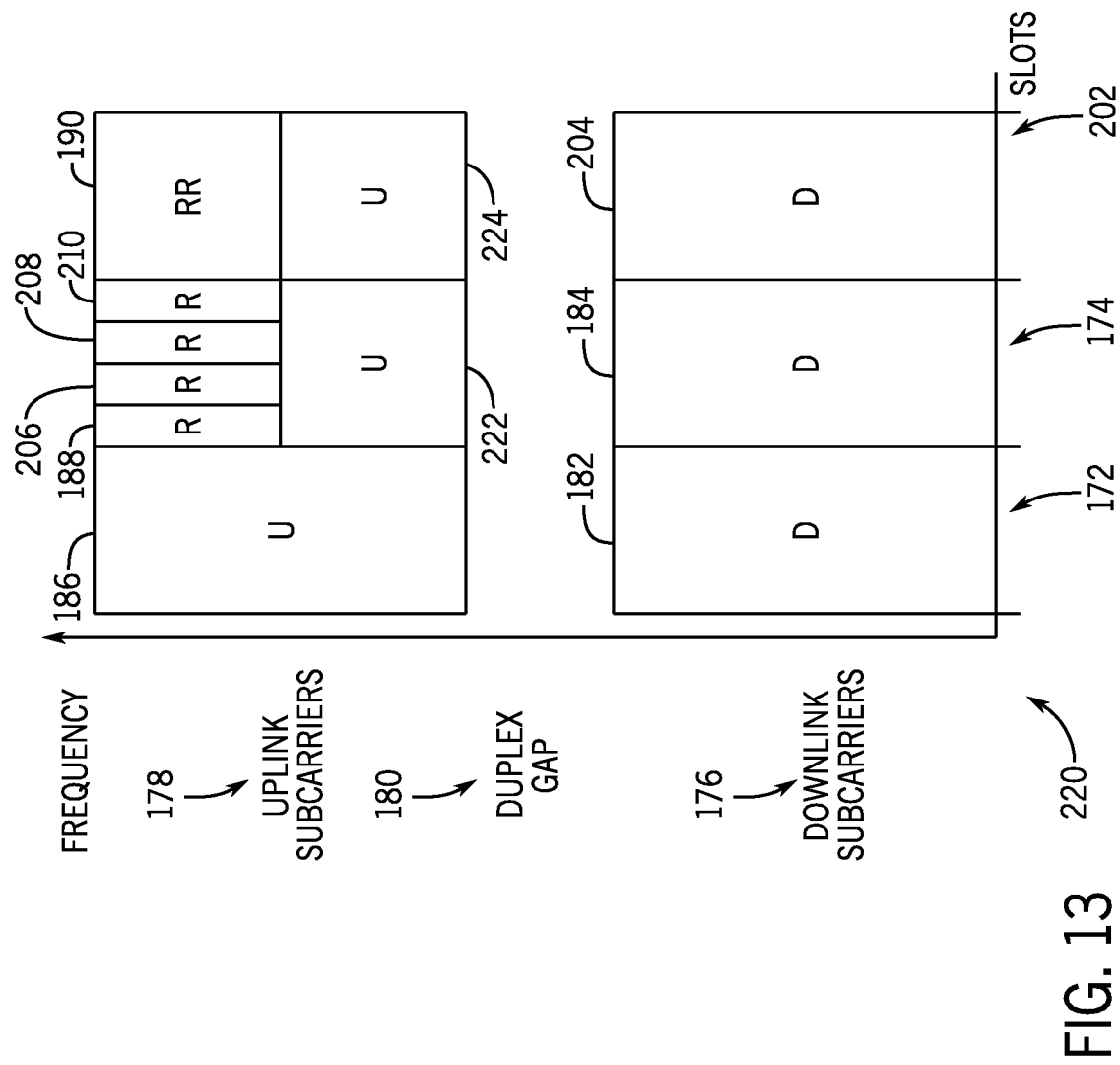
FIG. 13 is a graph of ranging allocation for the ranging system of FIG. 7 using frequency-division duplexing with multiple ranging devices using only a portion of the bandwidth of the electronic device of FIG. 1, in accordance with embodiments of the present disclosure.

As previously discussed, ranging may be performed using a narrower band than an entire bandwidth of carriers (e.g., the downlink subcarriers 176 and/or the uplink subcarriers 178). FIG. 13 illustrates a graph 220 where the ranging transmission portions 188, 206, 208, and 210 and the ranging receiving portion 190 use only a portion of the bandwidth of the subcarriers used (e.g., the uplink subcarriers 178). Thus, the uplink subcarriers 178 may be used for an uplink portion 222 in the slot 174 and for an uplink portion 224 in the slot 202. Similarly, if the downlink subcarriers 176 are used for ranging, the downlink subcarriers 176 may be used for an downlink portion in one or more slots that also use the downlink subcarriers 176 to perform ranging via the electronic device 10.

Figure 14:
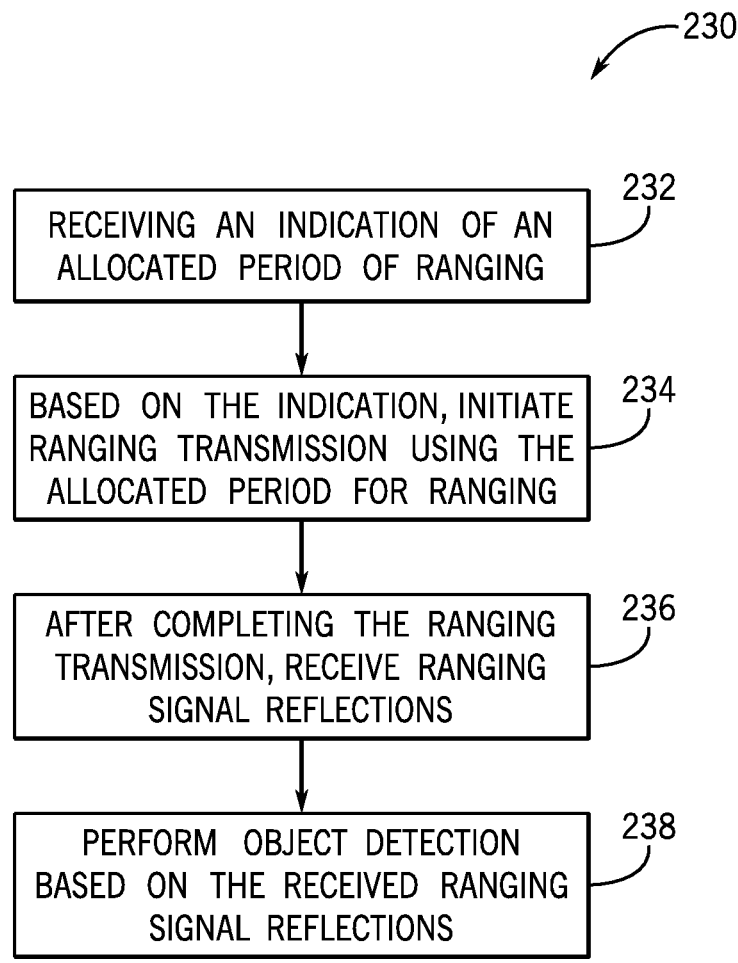
FIG. 14 is a block diagram of a process used by the electronic device of FIG. 1 to interact with an operator to perform ranging in a licensed spectrum, in accordance with embodiments of the present disclosure.

As previously discussed, ranging may be performed using the same band used for uplink and/or downlink communications in cellular networks. However, ranging may be performed by the electronic device 10 using a different band altogether. For instance, the different band may include a licensed or unlicensed spectrum that is separate from the subcarriers used in the cellular communications with the network. In a licensed spectrum, an operator (e.g., via a cellular network) may guarantee allocations to electronic devices 10. For instance, FIG. 14 illustrates a block diagram of a process 230 used by an electronic device 10 to interact with an operator to perform ranging in a licensed spectrum outside of the frequency bands used for uplink and downlink communications. The electronic device 10 receives an indication of an allocated portion (e.g., sub-slot) of ranging from an operator of the licensed spectrum (block 232). For instance, the indication may be a wireless network command received via a wireless network to which the electronic device 10 is connected. Furthermore, the indication may include an indication of a portion for ranging transmission (e.g., part of a slot) and an indication of a portion for ranging reception (e.g., part of a slot) for the electronic device 10. Based on the indication, the electronic device 10 initiates ranging transmission using the allocated portion of ranging (block 234). The initiation of the ranging transmission may be set to occur some period of time after the indication is received. For example, the indication may indicate a start time for the ranging portion. For instance, the indication may include an indication of a slot and/or sub-slot for the electronic device to begin ranging procedures. This indication of a future allocation rather than an immediate ranging receiving portion may provide the electronic device sufficient switching time to activate the ranging carrier(s). Furthermore, if no other electronic devices 10 are in range of the electronic device 10, the indication may include a command for the electronic device 10 to perform ranging at-will (at least until another ranging device is detected within proximity of the electronic device 10 and the command in rescinded with a subsequent command).

After completing the ranging transmission, the electronic device 10 receives ranging signal reflections that are reflected from objects in a ranging area around the electronic device 10 (block 236). In some embodiments, the electronic device 10 monitors for reflected ranging signals immediately after stopping ranging transmissions. Alternatively, the electronic device 10 may wait for an allocated time (e.g., ranging receiving portion 190) to begin monitoring for reflected ranging signals. This delay in monitoring may be used to avoid capturing other ranging devices transmitted ranging signals sent during a corresponding allocated portion for the other ranging devices. However, as discussed below, receiving ranging signals from other ranging devices may be used to provide various additional benefits, such as neighbor discovery and/or precise positioning of either ranging device. Once the reflected ranging signals are received, the electronic device 10 may perform object detection based on the received reflected ranging signals (block 238). The electronic device 10 may offload at least a portion of the reflected ranging signal processing to another computing device (e.g., a cloud-based processing system).

Figure 15:
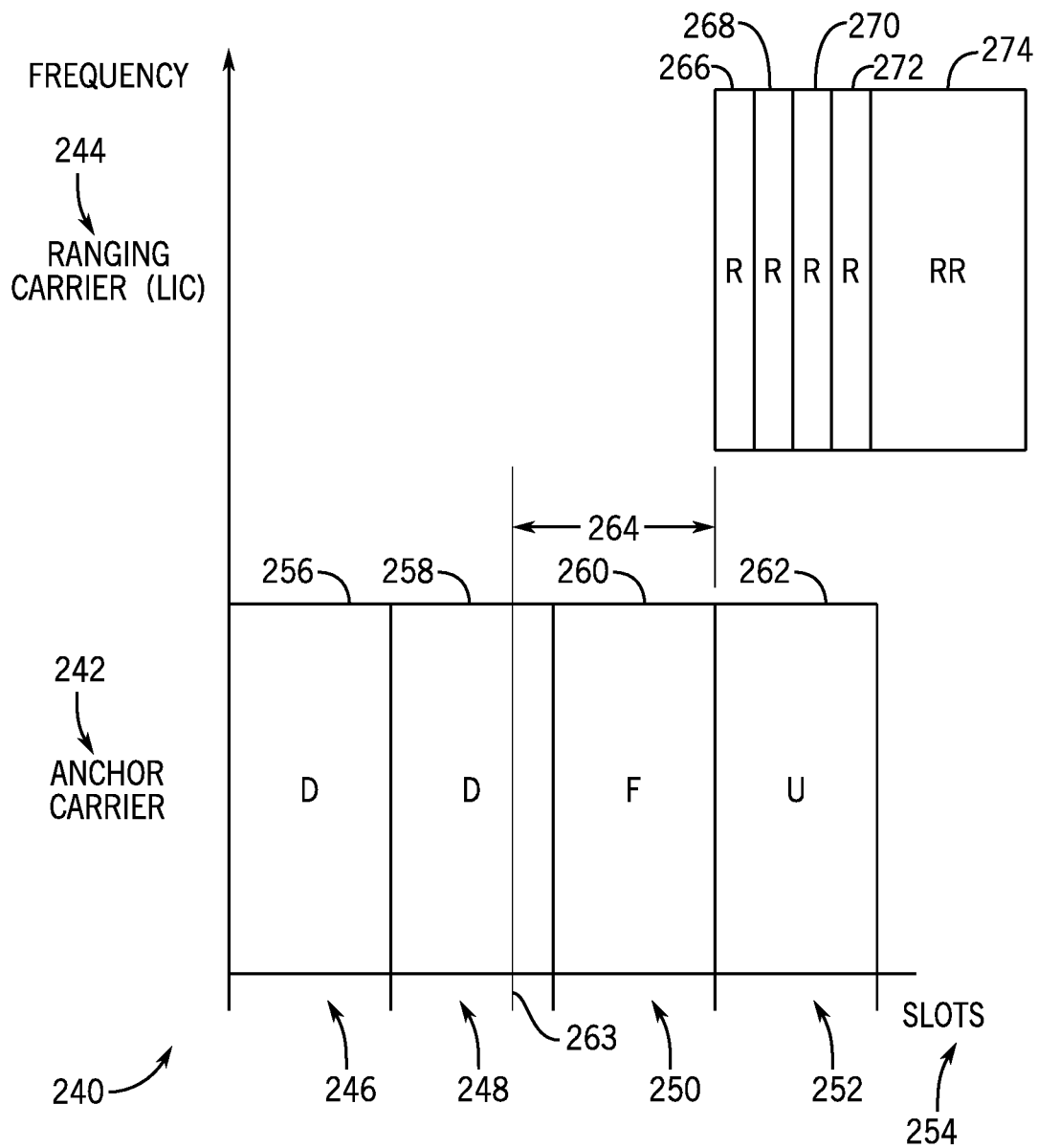
FIG. 15 is a graph of carrier allocations used in the process of FIG. 14, in accordance with embodiments of the present disclosure.

FIG. 15 illustrates a graph 240 where ranging is performed out-of-band with cellular communications in a licensed spectrum using TDD. The graph 240 illustrates an anchor carrier 242 used to perform cellular communications in a communication spectrum and that is used to setup a ranging carrier 244 used to perform ranging in a licensed spectrum. Here, the anchor carrier 242 includes subcarriers used to communicate with a cellular network. As illustrated, the spectrum of the ranging carrier 244 may include higher frequencies than the anchor carrier 242. Alternatively, the spectrum of the ranging carrier 244 may include lower frequencies than the anchor carrier 242. The graph 240 also illustrates slots 246, 248, 250, and 252. During downlink portions 256 and 258, the anchor carrier 242 are allocated to downlink communications. During a flexible portion 260, the anchor carrier 242 may be allocated to uplink and/or downlink communications. During an uplink portion 262, the anchor carrier 242 may be allocated to uplink communications. At point 263, an indication that ranging is to occur is received at the electronic device 10. For instance, the indication may be included in a command from the wireless network to the electronic device 10 to begin ranging. The indication may specify a switching time to activate the ranging carrier 244. This switching time may enable the electronic device 10 to align ranging with a beginning of a corresponding slot (e.g., the slot 252). The network may configure a switching time offset to accommodate any timing differences between the device and network in order to achieve synchronization in the ranging carrier. When multiple electronic devices 10 are allocated to perform ranging transmissions, the indication may include an indication of which portion of the slot 252 is to be used by the electronic device 10 for ranging transmissions. For example, the indication may indicate that the electronic device 10 is to transmit ranging signals during a ranging transmission portion 266 while other ranging devices are allocated to ranging transmission portions 268, 270, and 272. Each of the ranging devices then monitor for reflected ranging signals in a ranging receiving portion 274 for the ranging carrier 244. Although the graph 240 includes ranging transmission and receiving in different slots, if numerology for the cellular network provides sufficient timing, the ranging transmission portion 266 and the ranging receiving portion 274 may occur in the same slot (e.g., the slot 252).

Furthermore, the FIG. 15 is directed to a TDD system. However, the same anchor principles discussed in relation to FIG. 15 may be used to perform ranging with a spectrum outside of respective uplink and downlink subcarriers in an FDD system. In an FDD system, the uplink carriers and/or the downlink carriers may be used as the anchor carrier to setup the ranging carrier 244.

Figure 16:
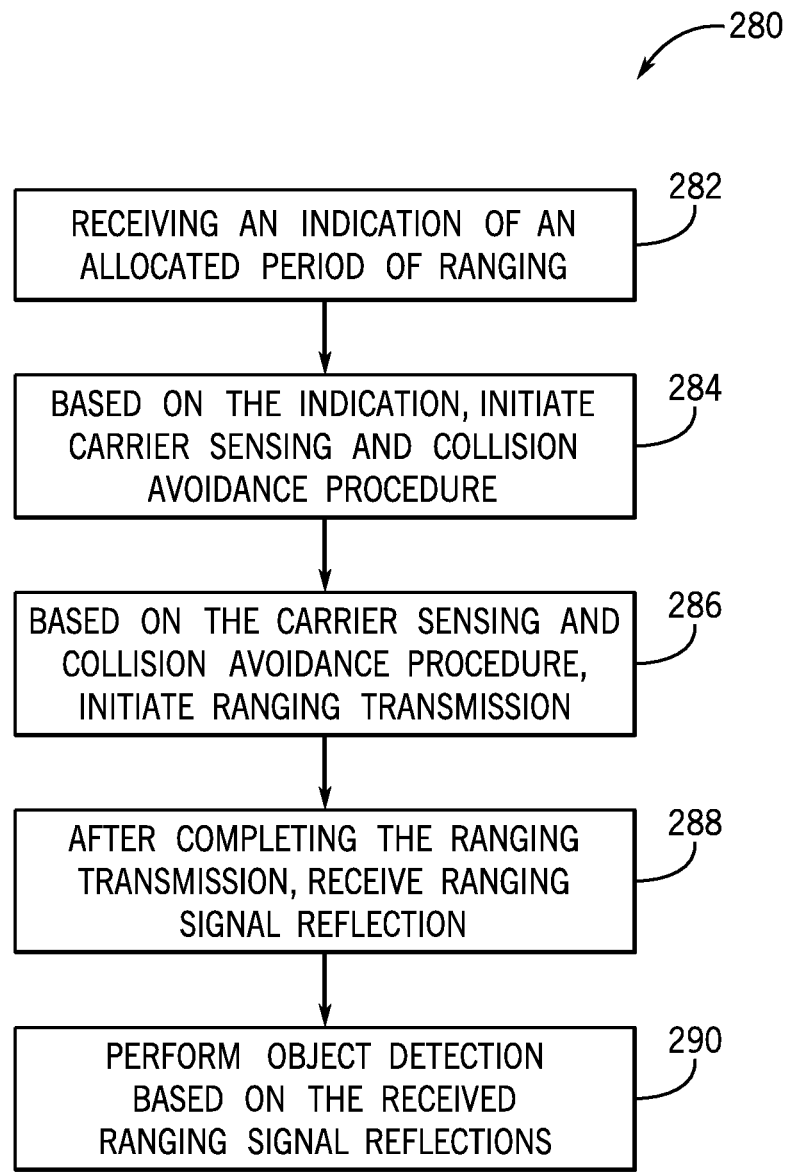
FIG. 16 is a block diagram of a process used by the electronic device of FIG. 1 to interact with an operator to perform ranging in an unlicensed spectrum with carrier sensing, in accordance with embodiments of the present disclosure.

FIG. 16 illustrates a block diagram of a process 280 used by the electronic device 10 to perform ranging in an unlicensed spectrum outside of the frequency bands used for uplink and downlink communications. The electronic device 10 receives an indication of an allocated portion (e.g., sub-slot) of ranging from an operator of the licensed spectrum (block 282). For instance, the indication may be a wireless network command received via a wireless network to which the electronic device 10 is connected. Furthermore, the indication may include an indication of a portion to activate the ranging carrier 244 and initiate carrier sensing and collision avoidance procedure since no operator exists on the unlicensed band. Based on the indication, the electronic device 10 initiates the carrier sensing and collision avoidance procedure (block 284). The carrier sensing and collision avoidance procedure may include a carrier sensing or listen-before-talking (LBT) scheme where the electronic device 10 listens during a LBT portion before transmitting. The initiation of the LBT portion may be set to occur some period of time after the indication is received. For example, the indication may indicate a start time for the LBT portion. For instance, the indication may include an indication of one or more slot(s) for the LBT portion, a sub-slot for the electronic device 10 to begin ranging transmission during a slot, and/or a slot to begin monitoring for reflected ranging signal. This indication of a future initiation of the LBT portion may provide the electronic device sufficient switching time to activate the ranging carrier(s). Alternatively, the command may designate only the start and/or duration of the LBT portion, and the electronic devices 10 may attempt to initiate ranging after the LBT portion has lapsed. Regardless of whether the sub-slot for ranging transmission or the slot for ranging receiving is specified, if collision occurs for ranging transmissions during the LBT portion, the ranging transmission portion 266 may be delayed by a period of time. The period of time may be a set amount (e.g., a next slot) or a random amount of time.

Based on the indication and the results of the carrier sensing and collision avoidance procedure, the electronic device 10 initiates the ranging transmission using the allocated portion of ranging (block 286). As previously discussed, the initiation of the ranging transmission may be set to occur some period of time after the indication is received or set relative to the LBT portion. For example, the indication may indicate a relative start time for the ranging transmission portion relative to the indication and/or it may indicate a relative start time for the ranging transmission portion relative to the LBT portion.

After completing the ranging transmission, the electronic device 10 receives ranging signal reflections that are reflected from objects in a ranging area around the electronic device 10 (block 288). In some embodiments, the electronic device 10 monitors for reflected ranging signals immediately after stopping transmitting the ranging signals. Alternatively, the electronic device 10 may wait for an allocated time (e.g., ranging receiving portion 274) to begin monitoring for reflected ranging signals. This delay in monitoring may be used to avoid capturing other ranging devices' transmitted ranging signals sent during corresponding allocated portions for the other ranging devices. Once the reflected ranging signals for the electronic device 10 are received, the electronic device 10 may perform object detection based on the received reflected ranging signals (block 238). The electronic device 10 may offload at least a portion of the reflected ranging signal processing to another computing device (e.g., a cloud-based processing system) via the cellular network and/or another wireless network.

Figure 17:
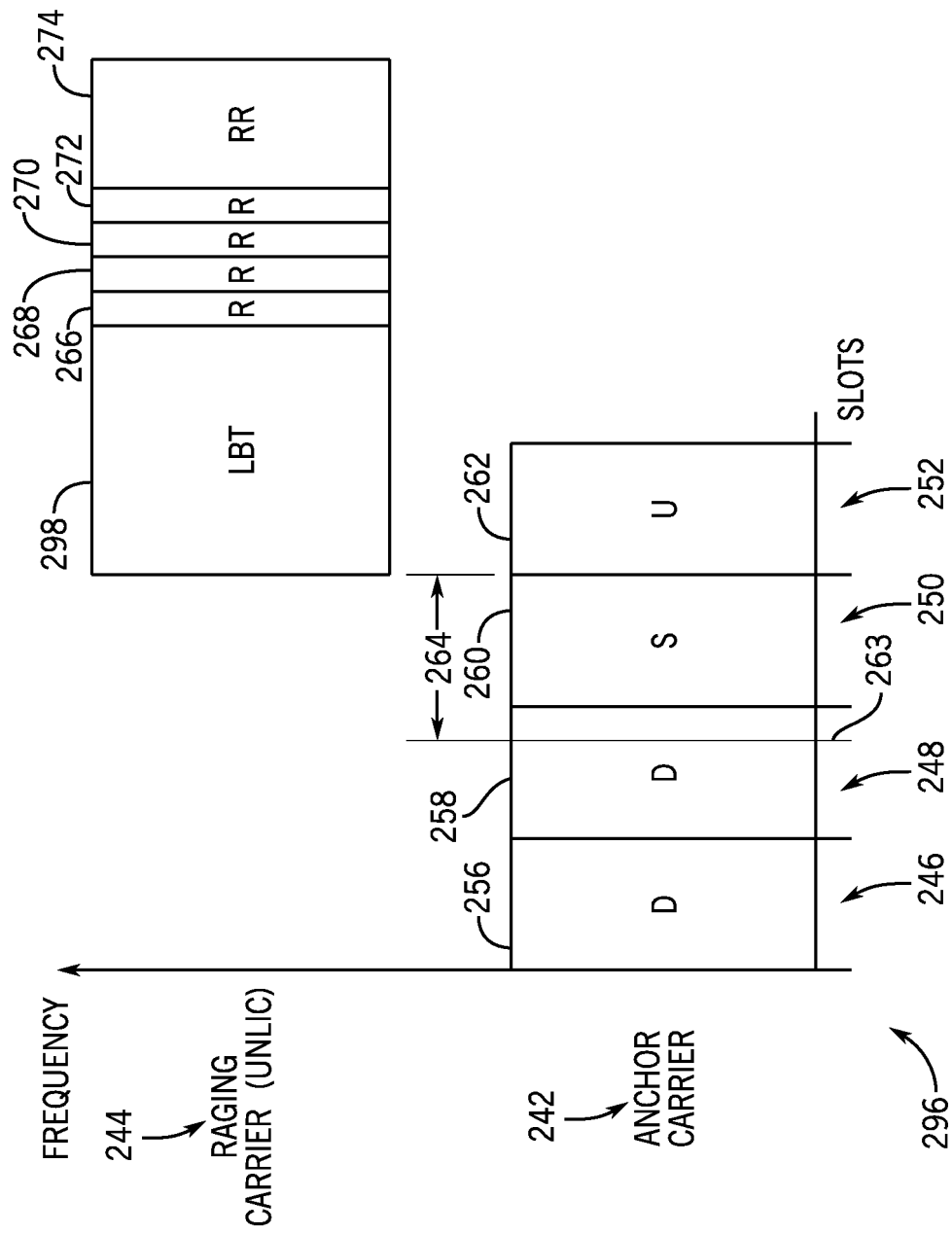
FIG. 17 is a graph of carrier allocations used in the process of FIG. 16, in accordance with embodiments of the present disclosure.

FIG. 17 is a graph 296 where ranging is performed out-of-band with cellular communications in a licensed spectrum using TDD. The graph 296 is identical to the graph 240 except that the indication at time 263 causes the initiation of the LBT 298 since no operator guarantees that allocated slots are available to the ranging devices.

Figure 18:
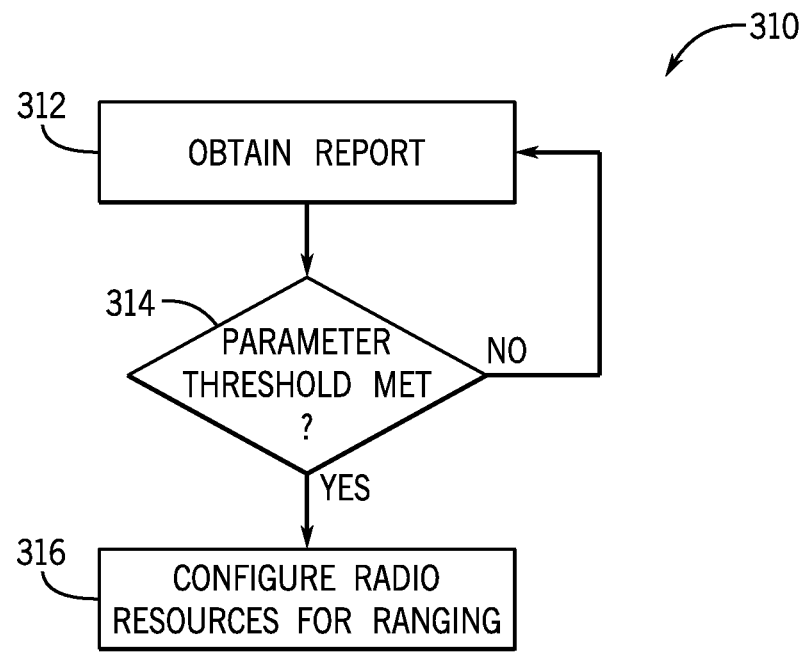
FIG. 18 is a block diagram of a process that is used to perform radio resource configuration, in accordance with embodiments of the present disclosure.

The foregoing discussion related to FIGS. 8-17 relates to allocation of ranging resources. The ranging resources may then be configured by the electronic device 10 and/or the cellular network to which the electronic device 10 is connected. The cellular network may send commands to configure the radio resources in a periodic or aperiodic scheme. For example, the configuration commands may be transmitted at the time 263 when the command to perform ranging is transmitted. The configuration of the resources may be performed based on reports and/or events. For instance, FIG. 18 is a block diagram of a process 310 that is used to perform radio resource configuration. The electronic device 10 and/or the network to which it is connected obtains a report (block 312).

The report may include a report about the electronic device 10. For instance, the report may be request that ranging resources have been requested by the electronic device 10. Additionally or alternatively, the report may be related to cellular communications (e.g., 5G NR), such as measurement reports related to cellular communications by the electronic device 10 with the cellular network, power headroom for cellular communications between the cellular network and the electronic device 10, and the like. Additionally or alternatively, the report may be related to power availability in the electronic device 10, such as an indication of battery level and/or whether a power save mode for the electronic device 10 has been engaged. In some embodiments, the report may be related to other network statistics, such as whether repeat requests are used in the communications by the cellular network (e.g., hybrid automatic repeat requests (HARQ)), cell capacity, and the like.

Based on the report, the electronic device 10 and/or the network, determines whether a parameter threshold is met for one or more parameters in the report (block 314). For instance, the electronic device 10 and/or the network may determine that the cell has available slots for ranging due to load being relatively low, the electronic device 10 communications with a cell not needing to be rebroadcast due to weak connections, and the like. This determination may be made based on the measurements from the electronic device 10, other devices in the cellular network, and/or network statistics from the cellular network. Furthermore, the parameter may be related to an indication of whether the electronic device 10 has enough power to perform ranging and/or is set to a mode that is permitted to perform ranging. For instance, the parameter may include an indication of a battery level in the electronic device exceeding a threshold charge and/or an indication of that the electronic device 10 is not set to a power save mode and may not allocate ranging resources to the electronic device 10. Based on the parameter, the network and/or the electronic device 10 configures the radio resources (block 316). The electronic device 10 then uses the radio resources to perform ranging as previously discussed in relation to FIGS. 8-17.

As previously noted, ranging resources may include frequency and/or time domain resources. Furthermore, the allocation of ranging resources may include frequency and/or time domain resources for a single ranging transmission and receiving opportunity, frequency and/or time domain resources for repeated transmission and receiving opportunities, or a combination thereof. The allocation of repeated ranging resources to the electronic device 10 may be based at least in part on device capabilities and/or on requested information by the electronic device. For example, the allocation of repeated ranging resources may be granted to an electronic device 10 toward a single target for enhanced resolution or robustness, toward multiple directions (assuming that the electronic device 10 performs beamforming) to obtain a range and spatial map around the electronic device 10, and the like. Additionally, the allocation of repeated resources may be performed to provide a requested bandwidth of ranging signals to optimize a range/resolution tradeoff in ranging processing. Furthermore, the allocation may include a requested duration of receiving portion to optimize a depth of ranging resolution by providing additional time for reflected ranging signals to be received back at the electronic device 10.

Although ranging may be used to detect objects in proximity to the electronic device 10, ranging may also be used to identify the electronic device 10 to other devices and/or to identify other ranging devices to the electronic device 10.

Figure 19:
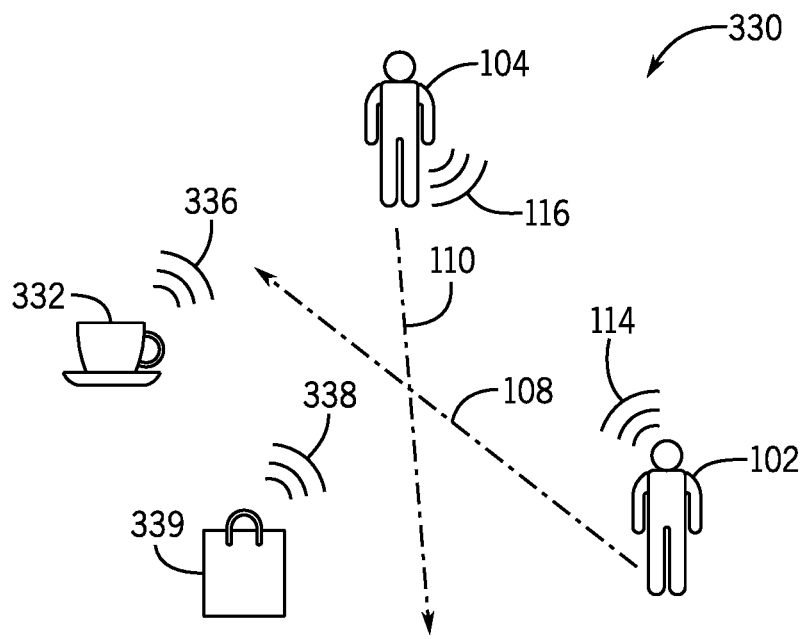
FIG. 19 is a diagram of a proximity communication system including the electronic device of FIG. 1, in accordance with embodiments of the present disclosure.

Additionally or alternatively, proximity communication services can be enabled with the network-managed ranging and neighbor discovery using encoded ranging signals and/or side-link (SL) neighbor discovery. For example, the proximity communication services may include gigabit point-to-point transfers of digital media, location-based advertising, and the like. FIG. 19 illustrates a diagram of a proximity communication system 330 that may be deployed with the network-managed ranging and neighbor discovery. Users 102 and 104 may have directions of travel with ranging signals 114 and 116. These ranging signals 114 and 116 may be encoded or interwoven with neighbor discovery signals that enable shops 332 and 334 to serve up information to the users 102 and 104 using respective transmissions 336 and 338 based on the encoded discovery signals and/or neighbor discovery of the users 102 and 104. For example, the shop 334 may send advertisements in the transmissions 338 to the user 104 based on a detected proximity of the user 104 to the shop 334. Furthermore, this information may be dynamic based on the proximity of the user 103 to the shop 334. For example, as the user 104 approaches the shop 334, the advertisement may have one offer, but as the user 104 moves away from the shop or the ranging signals 114 are no longer pointed toward the shop 334 (in the case of beamforming), an advertising incentive (e.g., larger percentage savings on purchases) may increase to provide additional motivation to the user 104 to turn towards and enter the shop 334.

Figure 20:
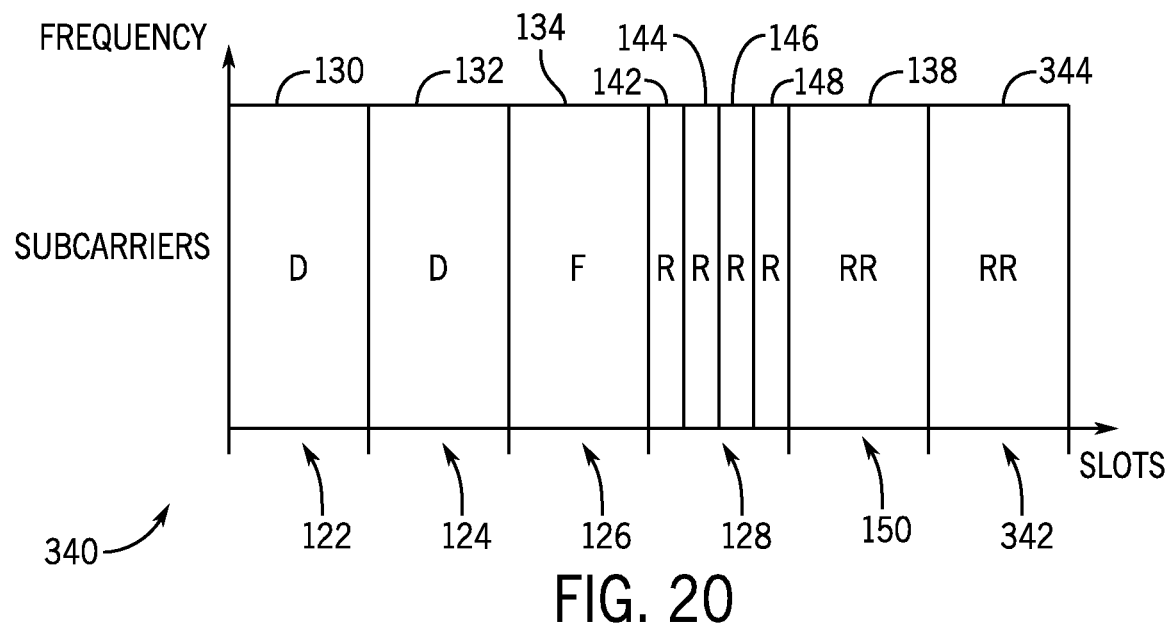
FIG. 20 is a graph of allocations of the proximity communication system of FIG. 21 with encoded ranging signals, in accordance with embodiments of the present disclosure.

FIG. 20 is a graph 340 of allocations of subcarriers during different slots using encoded ranging signals. The graph 340 may be similar to the graph 140 of FIG. 9 except that the ranging transmission portions 142, 144, 146, and 148 may be encoded with identifying code that identifies the respective ranging devices broadcasting the ranging signals. Each of these codes may be user-specific to a user using the respective ranging devices that enables a device receiving the signals to identify the ranging user and/or ranging device. To accommodate these codes in the ranging signals, one or more additional slots 342 may be allocated with respective one or more ranging receiving portions 344. During both ranging receiving portions 138 and 344, electronic devices 10 may be used to discover neighboring users by receiving their encoded ranging signals and/or SL sequences alternative to or in addition to ranging procedures.

Figure 21:
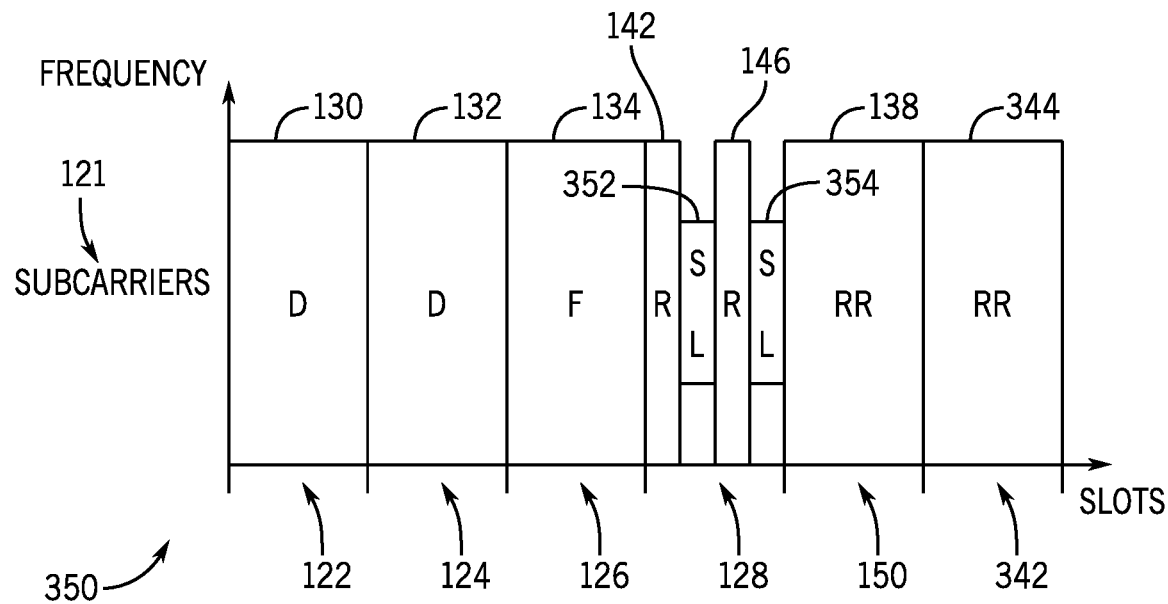
FIG. 21 is a graph of allocations of the proximity communication system of FIG. 21 with side-link sequences embedded in ranging signals, in accordance with embodiments of the present disclosure.

FIG. 21 is a graph 350 of allocations of subcarriers using SL communications. SL communications (e.g., LTE Sidelink or similar SL communications in 5G) may enable the electronic devices 10 in a cellular network to communicate directly with each other without passing the SL communications through a base station of the cellular network. As illustrated, the graph 350 is similar to the graph 340 of FIG. 20 except that the graph 350 includes SL sequences 352 and 354 embedded between the ranging transmission portions 142 and 146. The network may still manage the assignment of the SL sequences 352 and 354. The assignment of the SL sequences 352 and 352 to specific electronic devices 10 may be based on network load, network deployment, and/or capabilities of the various electronic devices 10. The SL sequences 352 and 354 may be used to share location information between electronic devices 10. For instance, location information may be directly encoded in the SL sequence. Additionally or alternatively, the SL sequence may provide verification information to the receiving electronic device 10 to obtain location information of the transmitting electronic device 10 from the network and/or a cloud using the verification information that indicates that the receiving and transmitting electronic devices 10 are within ranging proximity of each other. The location information may include a specific location of the transmitting electronic device 10 or may be a mere indication that the transmitting electronic device 10 is within a ranging location of the receiving electronic device 10.

The user 102 may not want to share location information of his or her electronic device 10 to any other electronic device 10 within range. To enable the user 102 to allow some devices to access his or her location information while preventing other accessing the location, location information may only be shared with devices that have a shared security context with the ranging electronic device.

Figure 22:
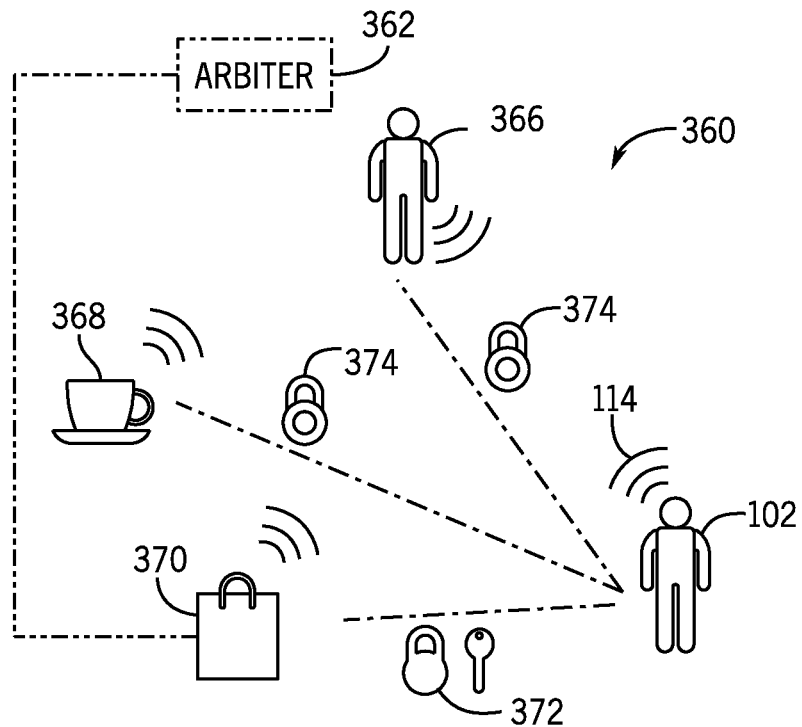
FIG. 22 is a diagram of a proximity communication system including the electronic device of FIG. 1 and using security contexts to secure location information, in accordance with embodiments of the present disclosure.

FIG. 22 is a diagram of a secured proximity communication services system 360. The user 102 uses a ranging electronic device to send out the ranging signals 114 with an encoded ranging signal or along with a corresponding SL sequence. The encoding for the ranging signal or SL sequence 352 may be assigned to the electronic device of the user using an arbiter 362. The arbiter 362 may include another electronic device in the cellular network and/or may include a cloud to which the electronic device of the user 102 may communicate. The ranging signals 114 may be received at respective electronic devices of a user 366, a shop 368, and a shop 370. However, only the shop 370 has a shared security context 372 that enables the shop 370 to have access to location information about the user 102. The user 366 and the shop 368 lack a shared security context with the user 102 and thus have a locked context 374 that prevents the user 366 and the shop 368 from accessing location information about the user 102. In some embodiments, the arbiter 362 may be used to authenticate that the shop 370 is to have access to the location information. In some embodiments, the electronic device of the shop 370 has access to the location information directly from the SL sequence or encoded ranging signals using a key to decode the SL sequence and/or the encoded ranging signals. This key may be sent to the shop 370 from the arbiter 362 and/or the electronic device of the user 102.

Figure 23:
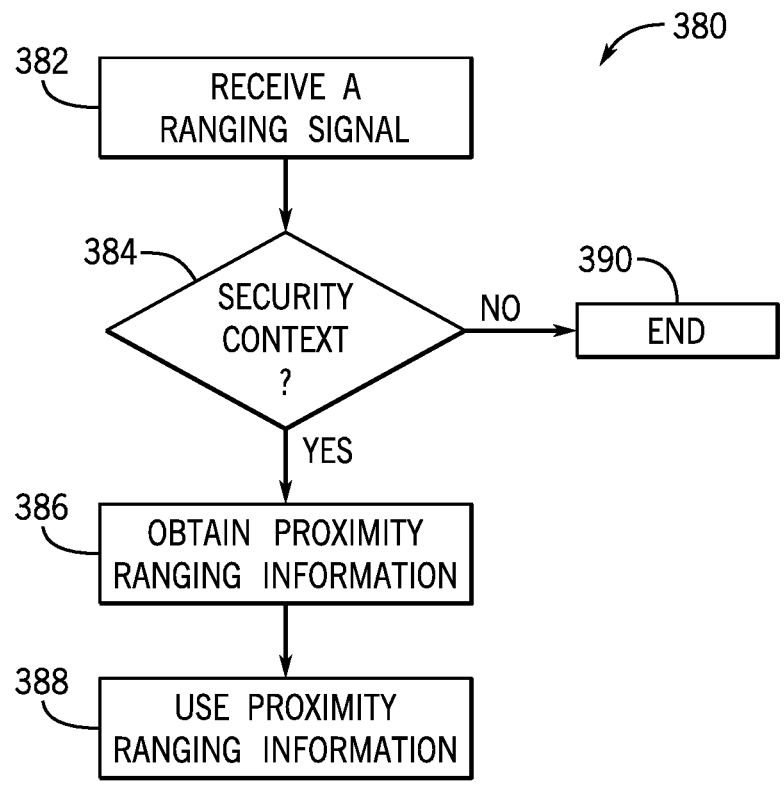
FIG. 23 is a block diagram of a process performed by receiving devices of the proximity communication of FIG. 22, in accordance with embodiments of the present disclosure.

FIG. 23 is a block diagram of a process 380 that may be used by a receiving device that receives ranging signals from other devices proximal to the receiving device. At the antenna(s) 20 of the receiving device (e.g., electronic device 10), the receiving device receives a ranging signal (block 382). As previously discussed, this ranging signal may be encoded and/or be accompanied by an SL sequence.

The receiving device determines whether it has a security context with an electronic device sending the ranging signal (block 384). For instance, the shared security context may include a mutual authentication between the ranging electronic device and a receiving electronic device where the user 102 has granted the receiving electronic device access to location information through an application, such as a mobile friend tracking application. This mutual authentication may be then stored in a cloud storage. Additionally or alternatively, relevant information about the electronic device of the user 102 may be stored in the authenticated devices. For example, the receiving electronic device may have a table of encoded ranging codes stored locally that identify one or more ranging electronic devices. Additionally or alternatively, the receiving electronic device may have a key that is used to decode the encoded SL sequence and/or encoded ranging signals. In some embodiments, the receiving device may send the encoded SL sequence and/or encoded ranging signals to the arbiter 362 for approval that the receiving electronic device is to have access to the location information of the ranging electronic device. In certain of these embodiments, the receiving device may filter out codes other than those that the receiving device has previously been authorized and/or provided a security context before sending the encoded SL sequence and/or encoded ranging signals to the arbiter 362. In either case, verification of the security context may be provided or denied to the receiving device in the form of providing or denying provision of location information of the ranging device to the receiving device.

The security context may also be used for categories of receiving devices. For example, the user 102 may opt into advertisements or other communications from vendors and/or opting out of advertisements or other communications from vendors. This opting in or out may be performed on grouped bases. For example, the user 102 may opt into advertisements from vendors having a certain type (e.g., shoe stores, computer stores, etc.) while opting out of advertisements of vendors having a different type (e.g., coffee shop, fast food, etc.). Additionally or alternatively, the user 102 may opt into or out of communications from specific vendors (e.g., the shop 368) irrespective of type of product offered by the vendors. Furthermore, this opting in or out may be performed for whole organizations or specific locations. For example, the user 102 may opt in/out on communications from a certain coffee store brand or may opt in/out for a single coffee store of that brand.

Categories of receiving devices may also include user interests. For example, the user 102 may opt into proximity detection for users having a common interest with the user 102. For instance, the common interest may be selected through a social media application and/or a mobile friend tracking app.

If the security context exists between the receiving device and the ranging device, the receiving device may obtain proximity ranging information (block 386). The receiving device may hen use the obtained proximity ranging information (block 388). For example, the receiving device may share content (e.g., advertisements) or may log that the user has entered into proximity of the receiving device. For example, the ranging signals may be used by a vendor (e.g., a gym, movie theater) to track when users/subscribers have attended the vendor location. This tracked proximity may then be used to provide incentives (e.g., loyalty points) to the user 102 for coming into proximity of the receiving device and/or to incentivize future actions.

If no security context exists, the encoded ranging signals and/or the SL sequences may be discarded by the receiving device without accessing proximity/location information (block 390). When no security context exists, the ranging signals may not be used for proximity detection by the receiving devices, but the ranging device may still use the ranging signals to perform obstacle detection and tracking on receiving devices with no security context (e.g., the user 366 and the shop 368).

Figure 24:
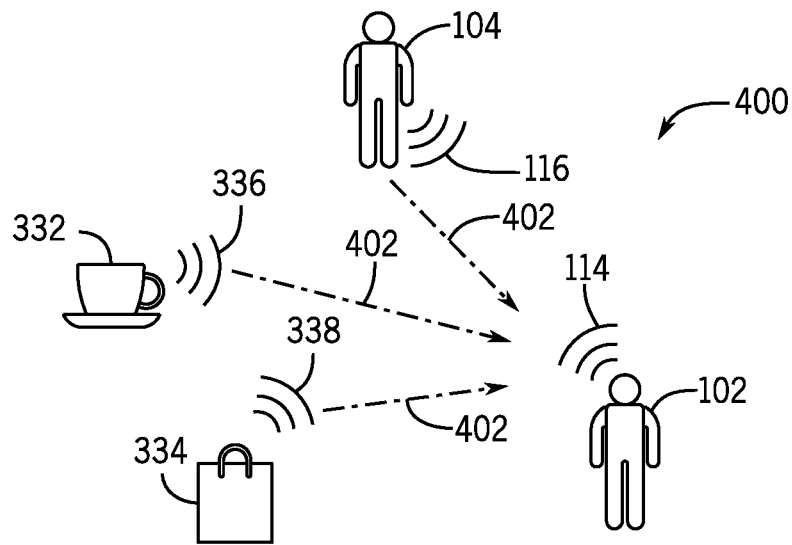
FIG. 24 is a diagram of an enhanced positioning signal system including the electronic device of FIG. 1, in accordance with embodiments of the present disclosure.

In addition to or alternative to using the SL sequences, a ranging device may embed enhanced positioning sequence (ePS) signals to one or more receiving devices. FIG. 24 is a diagram of an ePS system 400 that uses ePS signals to provide ultra-high resolution positioning. For instance, the ePS signals may be included in the ranging signals 114. For instance, the ePS signals between transmission portions like the SL sequences 352 and 354 are embedded between ranging transmission portions 142 and 146 in FIG. 21. Similar to the SL sequences, the ePSes may be assigned via the cellular network to which the ranging device is coupled. The network may assign ePSes based on network load, network deployment, capabilities of the ranging device, and/or other suitable parameters. When using high frequency bands (e.g., greater than 52.6 GHz), wide bandwidth may be available to licensed broadband services that enables high precision of the ePS signal, thereby enhancing the positioning accuracy for location-based content customization, such as advertising delivery.

The receiving devices of the user 104, the shop 332, and/or the shop 334 may know their own locations and may use the ePS signals along with their own locations with a high degree of certainty and precision. This is particularly useful when the receiving device is stationary, such as receiving devices located at the shop 332 and the shop 334, since the location information may be precise and consistent. The network and/or the ranging device may leverage the stationary high-precision locations of the user 103, the shop 332, and/or the shop 334 to perform high-precision calculation of a location of the ranging device. Using the known positions and the ePS signals, the locations of the user 104, the shop 332, and/or the shop 334 may be used to "triangulate" the location of the user 102 using the user 104, the shop 332, and/or the shop 334 as reference nodes. Furthermore, although three receiving devices are illustrated in the ePS system 400, similar triangulation techniques may be used with more or fewer receiving devices acting as reference nodes. The network may build a dynamic map of user's devices with the high-precision reference nodes and relative locations of the user's devices.

Using this precise location information, associated services may provide suitable information (e.g., advertisements) to enhance content delivery to specific locations to avoid "content pollution" due to mass delivery of the information (e.g., billboards) to anyone within a general proximity of the receiving device. This is especially true in high-density locations with heavy traffic (e.g., a mall). To pinpoint location-appropriate users, the delivered information may be kept private from users that are not within a specific location. Additionally or alternatively, users that do not satisfy requirements (e.g., opted into advertisements) may be excluded from the information. Furthermore, the ePS signals may be secured to only being accessible to receiving devices with a security context with the ranging device similar to the security context discussed in relation to encoded ranging signals and/or SL sequences previously discussed.

Figure 25:
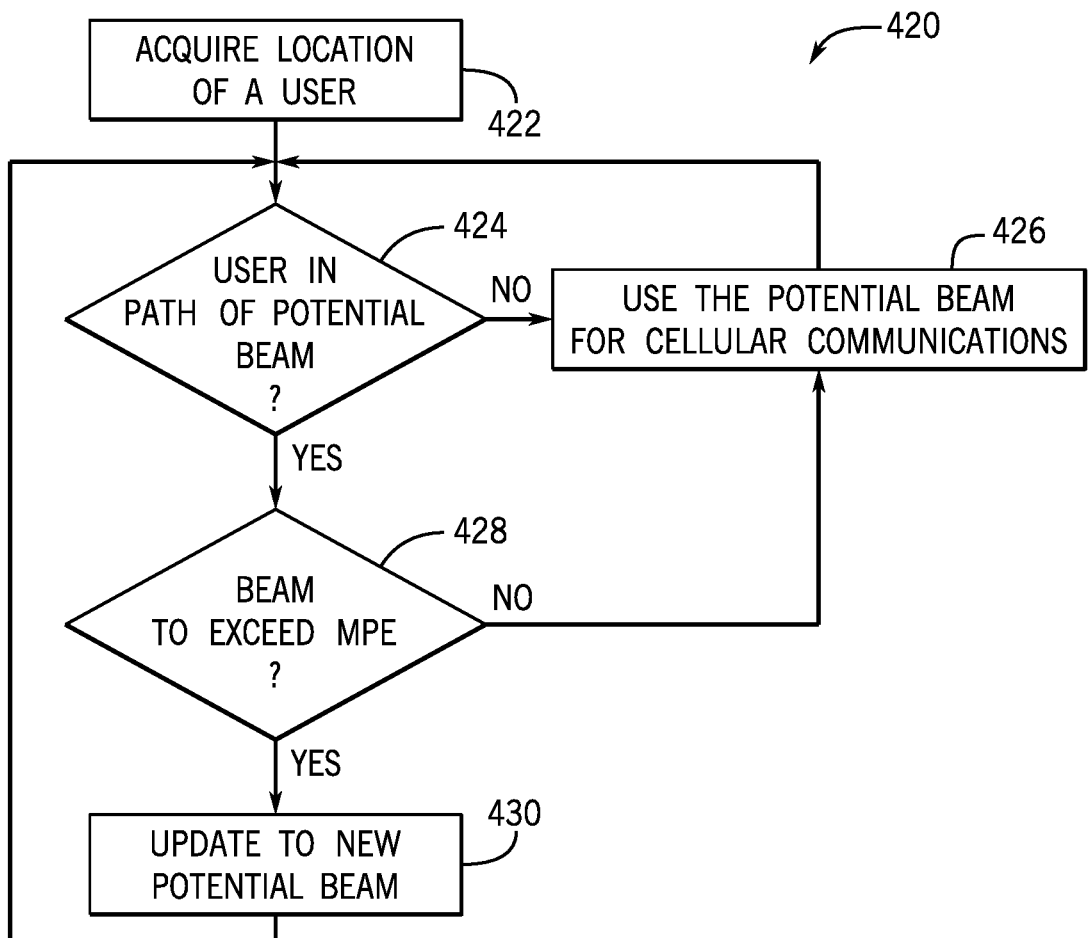
FIG. 25 is a block diagram of a process using ranging signals in a maximum permissible exposure application, in accordance with embodiments of the present disclosure.

FIG. 25 is a flow diagram of using the ranging signals to manage transmissions of the cellular signals using the electronic device. For example, 5G NR beamformed signals may have a potential maximum permissible exposure (MPE) controlling how much certain objects (e.g., users) may be subjected to the waves carrying the cellular communications. The MPE may be an instantaneous amount of exposure and/or a cumulative amount of exposure over time. The ranging signals may be used for MPE applications with user proximity sensing managed by the network. For example, FIG. 25 illustrates a process 420 that utilizes locations via ranging signals to manage beams according to locations and MPE levels. A ranging device (or cellular network) may determine a location of a user (block 422). For example, the user may be discovered using obstacle detection by the ranging device or the user's device, using neighbor discovery, using encoded ranging signals from the user's device, using an ePS-based map, and/or other location-determining procedures discussed herein. The location of the user may also include an expected position based on a direction and speed of travel of the user and/or the ranging device.

The network and/or the ranging device determines whether the determined location of the user is in the path of a potential beam to be used for communication between the network and the ranging device (block 424). If the determined location of the user is not in the path of the potential beam, the potential beam is used for cellular communications (block 426). However, if the determined location of the user is in the path of the potential beam, the network and/or the ranging device may determine whether the potential beam is likely to cause the user to be exposed to potential beam that causes the user to exceed the MPE (block 428). In situations where the MPE is over time, the determination may include determining whether additional usage of the potential beam will exceed the MPE. If the potential beam is not likely to cause exposure exceeding the MPE, the potential beam is used or continued to be used for cellular communications between the ranging device and the network. If the potential beam is likely to cause exposure exceeding the MPE, a new potential beam may be analyzed until a beam that satisfies MPE requirements is met (block 430). Furthermore, in some embodiments, multiple potential beams may be analyzed simultaneously with one of the beams selected for use in communicating between the network and the ranging device. The strongest beam that satisfies the MPE requirements may be selected from the multiple potential beams. However, if none of the potential beams satisfy the MPE requirements (and/or strength requirements), additional potential beams may be analyzed.

Although MPE processing has been discussed related to managing MPE due to cellular communications from the ranging device, other devices may use ranging information from the ranging device to manage MPE. For example, the network and/or other cellular devices may use a network map that maps ranging devices using ePS and managing MPE for formed beams based on locations of users and devices in the network map.

The specific embodiments described above have been shown by way of example, and it should be understood that these embodiments may be susceptible to various modifications and alternative forms. For example, the methods may be applied for embodiments having different numbers and/or locations for antennas, different groupings, and/or different networks. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
   one or more antennas;
   a network interface coupled to the one or more antennas and configured to:
      selectively send and receive cellular communications signals using the one or more antennas in corresponding communication slots for cellular communications for a cellular network; and selectively send ranging signals and receive reflected ranging signals using the one or more antennas during ranging slots that are allocated by the cellular network; and a processor operably coupled to the network interface and configured to:

encode the ranging signals based on a pre-existing security context between the electronic device and a receiving device to prevent identification of the electronic device when the electronic device and the receiving device lack a pre-existing security context; and determine a location of an obstacle or a location of the electronic device using the reflected ranging signals.

2. The electronic device of claim 1, wherein a slot of the ranging slots comprises:

a ranging transmission portion, wherein the electronic device is configured to transmit the ranging signals during the ranging transmission portion of the slot; and a ranging receiving portion, wherein the electronic device is configured to monitor for the reflected ranging signals transmitted during the ranging transmission portion of the slot.

3. The electronic device of claim 1, wherein:

a first slot of the ranging slots comprises a ranging transmission portion, wherein the electronic device is configured to transmit the ranging signals during the ranging transmission portion of the first slot, and a second slot of the ranging slots comprises a ranging receiving portion, wherein the electronic device is configured to monitor for the reflected ranging signals transmitted during the ranging transmission portion of the second slot.

4. The electronic device of claim 3, wherein the first slot of the ranging slots comprises an additional ranging transmission portion, wherein an additional electronic device is configured to transmit the ranging signals during the additional ranging transmission portion of the first slot.

5. The electronic device of claim 1, wherein the cellular communication signals and the ranging signals are configured to be transmitted and received using subcarriers that are used for both the ranging signals and the cellular communication signals.

6. The electronic device of claim 1, the cellular communication signals comprising:

uplink signals configured to use uplink subcarriers; and
downlink signals configured be use downlink subcarriers.

7. The electronic device of claim 6, wherein the ranging signals are configured to use the uplink subcarriers during the ranging slots.

8. The electronic device of claim 7, wherein the ranging signals use only a portion of the uplink subcarriers during the ranging slots while remaining uplink subcarriers are used for uplink transmissions during the ranging slots.

9. The electronic device of claim 6, wherein the ranging signals are configured to use the downlink subcarriers during the ranging slots.

10. The electronic device of claim 1, wherein the cellular communication signals are configured to use a first spectrum, wherein the ranging signals are configured to use a second spectrum, and wherein the first spectrum and the second spectrum do not have any overlapping frequencies.

11. The electronic device of claim 10, wherein the second spectrum comprises a licensed spectrum that has an operator that ensures that allocated slots are guaranteed for allocated devices.

12. The electronic device of claim 10, wherein the second spectrum is an unlicensed spectrum where allocated slots are not guaranteed.

13. The electronic device of claim 12, wherein the ranging slots comprise a look-before-talking portion.

14. A mobile cellular device, comprising:
one or more antennas; and
communication circuitry configured to:
send and receive cellular signals to a cellular network;
encode ranging signals to enable a receiving device to identify the mobile cellular device via neighbor discovery using encoded ranging signals when a pre-existing security context exists between the mobile cellular device and the receiving device and to prevent identification of the mobile cellular device when the mobile cellular device and the receiving device lack a pre-existing security context;
send the encoded ranging signals via the one or more antennas;
receive reflected ranging signals that are reflected from objects in a ranging area of the mobile cellular device; and
determine a location of an obstacle or a location of an electronic device using the reflected ranging signals.

15. The mobile cellular device of claim 14, the encoded ranging signals being embedded with a side-link sequence that enables the electronic device to perform neighbor discovery of the mobile cellular device using the side-link sequence.

16. The mobile cellular device of claim 15, wherein the electronic device is capable to identify the mobile cellular device or perform the neighbor discovery using the side-link sequence due to a pre-existing security context between the mobile cellular device and the electronic device.

17. The mobile cellular device of claim 16, wherein an additional receiving device is prevented from identifying the electronic device or performing neighbor discovery using the side-link sequence due to a lack of a pre-existing security context between the additional receiving device and the mobile cellular device.

18. The mobile cellular device of claim 14, wherein the encoded ranging signals are embedded with enhanced positioning sequences that enable the cellular network to locate the electronic device based at least in part on the enhanced positioning sequences and locations of stationary nodes within the cellular network that are configured to receive the enhanced positioning sequences.

19. A method, comprising:
encoding ranging signals based on a pre-existing security context between a ranging device and a receiving device to prevent identification of the ranging device when the ranging device and the receiving device lack a pre-existing security context;
determining a determined location of a user based at least in part on encoded ranging signals from a ranging device, wherein the determined location of the user is based at least in part on signals sent to or received from a user electronic device, the encoded ranging signals being allocated by a cellular network;
determining that the determined location of the user is in a path of a strongest beam for a cellular network by the ranging device;
determining that the strongest beam is likely to cause the user to be exposed to the strongest beam exceeding a maximum permissible exposure; and
using an alternative beam to communicate between the cellular network and the ranging device.

20. The method of claim 19, determining the determined location comprising predicting a location of the user based at least in part on a predicted location of the user based at least in part on a direction of travel for the user determined using the user electronic device.

* * * * *

UNITED STATES PATENT AND TRADEMARK OFFICE
CERTIFICATE OF CORRECTION

| | | |
|---|---|---|
| PATENT NO. | : 11,229,002 B2 | |
| APPLICATION NO. | : 16/824350 | |
| DATED | : January 18, 2022 | |
| INVENTOR(S) | : Anatoliy Sergey Ioffe, Rohit U. Nabar and Rastislav Vazney | |

It is certified that error appears in the above-identified patent and that said Letters Patent is hereby corrected as shown below:

In the Claims

Column 19, Claim 6, Line 48, please replace the word "be" with --to--.

Column 20, Claim 19, Line 54, please replace the word "a" with --the--; and
Claim 19, Line 61, please replace the word "a" with --the--.

Signed and Sealed this
Twenty-eighth Day of June, 2022

Katherine Kelly Vidal
*Director of the United States Patent and Trademark Office*